(12) United States Patent
Mckenzie et al.

(10) Patent No.: US 10,325,395 B2
(45) Date of Patent: Jun. 18, 2019

(54) TECHNIQUES FOR ANIMATING STICKERS WITH SOUND

(71) Applicant: Facebook, Inc., Menlo Park, CA (US)

(72) Inventors: Patricia Anne Mckenzie, Fife, WA (US); Duckjin Kang, Issaquah, WA (US); Dwayne B Mercredi, Kirkland, WA (US); Aaron Nech, Arlington, WA (US)

(73) Assignee: FACEBOOK, INC., Menlo Park, CA (US)

( * ) Notice: Subject to any disclaimer, the term of this patent is extended or adjusted under 35 U.S.C. 154(b) by 9 days.

(21) Appl. No.: 15/001,706

(22) Filed: Jan. 20, 2016

(65) Prior Publication Data

US 2017/0206697 A1 Jul. 20, 2017

(51) Int. Cl.
*G06T 13/20* (2011.01)
*G06T 13/80* (2011.01)
*H04N 21/439* (2011.01)
*H04N 21/482* (2011.01)

(52) U.S. Cl.
CPC ............ *G06T 13/205* (2013.01); *G06T 13/80* (2013.01); *H04N 21/439* (2013.01); *H04N 21/482* (2013.01)

(58) Field of Classification Search
CPC ... G06T 13/205; G06T 13/80; H04M 1/72544
See application file for complete search history.

(56) References Cited

U.S. PATENT DOCUMENTS

| | | | | |
|---|---|---|---|---|
| 5,923,337 | A * | 7/1999 | Yamamoto | G06T 13/80 345/473 |
| 2006/0204060 | A1* | 9/2006 | Huang | G06K 9/00335 382/118 |
| 2009/0016617 | A1* | 1/2009 | Bregman-Amitai | G06K 9/00281 382/229 |
| 2011/0022992 | A1* | 1/2011 | Zhou | G06T 13/205 715/863 |
| 2015/0287403 | A1* | 10/2015 | Holzer Zaslansky | G06T 13/205 704/231 |
| 2016/0203827 | A1* | 7/2016 | Leff | G06T 13/40 704/207 |
| 2018/0150202 | A1* | 5/2018 | Zheng | G06F 3/04847 |

* cited by examiner

*Primary Examiner* — Daniel F Hajnik

(57) ABSTRACT

Techniques for animating stickers with sound include receiving audio input by a first mobile device; animating a selected image according to an energy level of the audio input using a set of animation frames associated with the selected image in a user interface view of an application executing on the first mobile device; and presenting the animated image concurrently with receiving the audio input. Other embodiments are described and claimed.

20 Claims, 20 Drawing Sheets

TECHNIQUES FOR ANIMATING STICKERS WITH SOUND

BACKGROUND

Interpersonal communication has progressed from the written word and voice communication to instantaneous communications that may include text, images, video, and sound. Many sources of multimedia content exist from which a user can select content created by others to send in a communication. In order to create customized content, however, users may need specialized skills or access to specialized software tools that are out of reach to many users. It is with respect to these and other considerations that the present improvements are needed.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques for animating stickers with sound. Some embodiments are particularly directed to techniques for animating stickers with sound while the sound is being received. In one embodiment, for example, a method may include receiving a first control directive to select an image representing a set of animation frames in a user interface view of an application executing on a first mobile device; receiving a second control directive to begin receiving audio input in the user interface view; receiving audio input by the first mobile device; animating the image according to an energy level of the audio input using the animation frames; and presenting the animated image concurrently with receiving the audio input. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
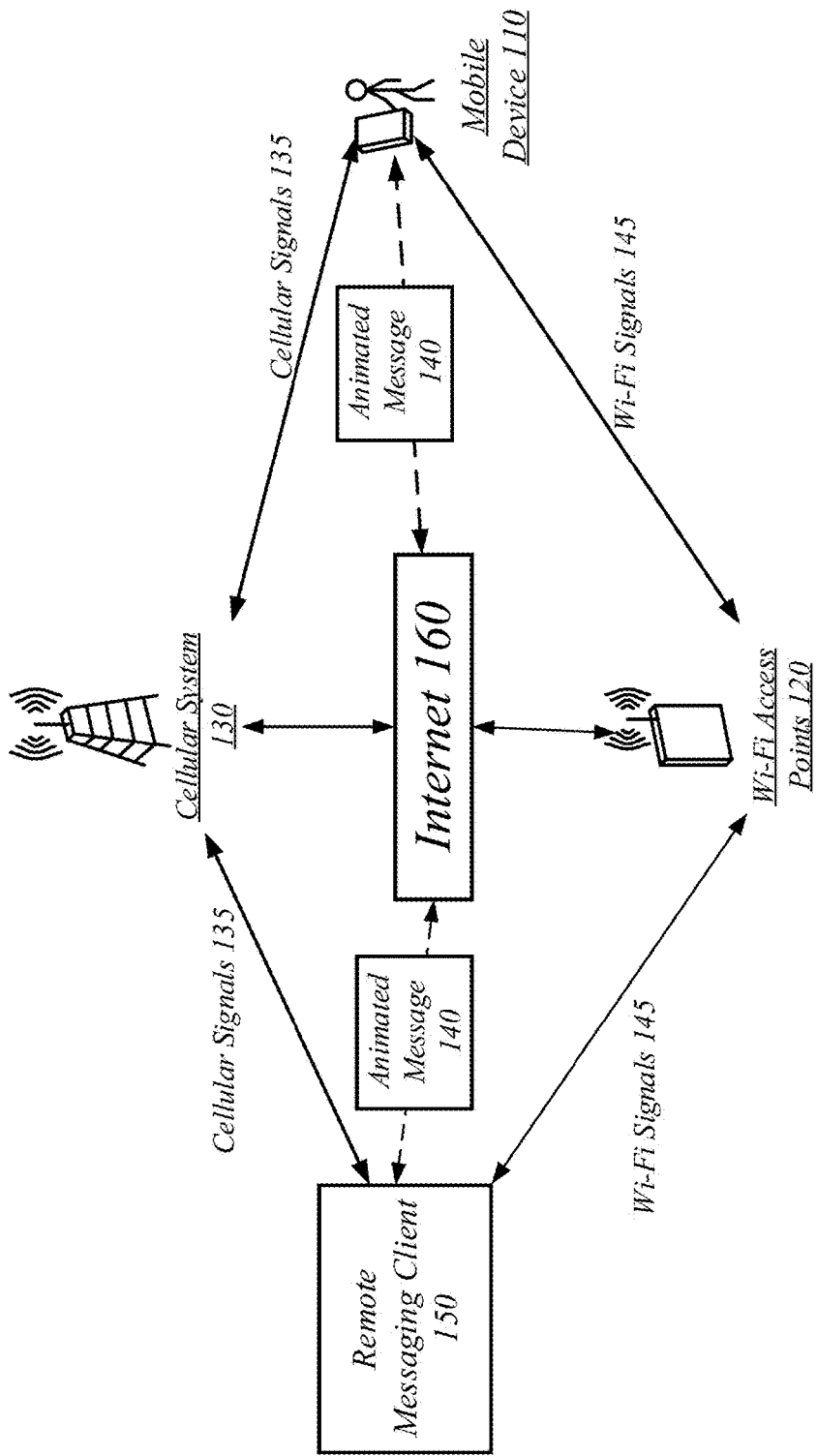
FIG. 1 illustrates an embodiment of an execution system for securing delivery of an animated message.

Various embodiments are generally directed to techniques for animating images, referred to herein as stickers, with sound. Some embodiments are particularly directed to techniques for animating a sticker while the sound is being produced and received, such that the animation appears to coincide with the sound. The animated sticker may be saved and may be sent to others as a message. A sticker may be a visual representation, such as a graphical user interface element (e.g., an object, icon, image, picture, etc.).

The operator of a mobile computing device may select a sticker for animation in an animation application, and may begin speaking. While the operator is speaking, the audio input of the speech is received and analyzed. The energy level of the audio input may be measured and used to select various animation frames to output in sequence to create the animation. The energy level measurements and animation frame selection and output may occur quickly enough that the animation appears to the human operator to coincide with the speech. This allows the operator to see the animation right away while they are speaking, and to create customized animated stickers that can be saved and/or sent to others, without needing any animation expertise on the part of the operator.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to an apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct a more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for an animated messaging system 100 for communicating using animated stickers. In one embodiment, the system 100 may comprise a computer-implemented system 100 having a mobile device 110 operated by a sender, and a remote messaging client 150 executing on a mobile device operated by a recipient, each comprising one or more components. Although the system 100 shown in FIG. 1 has a limited number of elements in a certain topology, it may be appreciated that the system 100 may include more or fewer elements in alternate topologies as desired for a given implementation. As shown in FIG. 1, the sender and the recipient may be carrying out a messaging conversation with the exchange of at least one animated message 140.

A mobile device 110 may be any mobile electronic device capable of, at least, receiving audio data and/or recording audio data from a microphone, outputting audio data to the sender, and communicating with other devices to exchange data and instructions over a network. The mobile device 110 may communicate with other devices using wireless transmissions to exchange network traffic. Exchanging network traffic, such as may be included in the exchange of an animated message 140, may comprise transmitting and receiving network traffic via a network interface controller (NIC). A NIC comprises a hardware component connecting a computer device, such as mobile device 110, to a computer network. The NIC may be associated with a software network interface empowering software applications to access and use the NIC. Network traffic may be received over the computer network as signals transmitted over data links. The network traffic may be received by capturing these signals and interpreting them. The NIC may receive network traffic over the computer network and transfer the network traffic to memory storage accessible to software applications using a network interface application programming interface (API).

The mobile device 110 may perform various operations using network data accessed over a network. The mobile device 110 may access a cellular system 130 using cellular signals 135. The cellular system 130 may be a cellular network including data access, the cellular system 130 provided by a cellular provider with which the user of the mobile device 110 has a service contract, the service contract for cellular data service to the mobile device 110. The mobile device 110 may use the cellular system 130 to access the public Internet 160 for interacting with one or more other devices.

The mobile device 110 may access one or more Wi-Fi access points 120 using Wi-Fi signals 145. Wi-Fi access points 120 may be provided by a plurality of different operators. Some of the Wi-Fi access points 120 may be personal in nature, such as a home Wi-Fi network operated by the user of mobile device 110 based on a domestic Internet connection. Some of the Wi-Fi access points 120 may be free of charge or provided as a complimentary portion of a service, such as free Wi-Fi service in coffee shops, hotels, and other public accommodations. The mobile device 110 may use Wi-Fi access points 120 to access the public Internet 160 for interacting with one or more other devices. The dashed line between the Internet 160 and mobile device 110 indicates that an animated message 140 may be exchanged with other devices ultimately using the Internet 160, with one of the cellular system 130 and Wi-Fi access point 120 acting as the medium to access the Internet 160.

The system 100 may also include a remote messaging client 150. The remote messaging client 150 may be software and/or a combination of software and hardware operating on any electronic device capable of sending and receiving an animated message 140 to and from the mobile device 110. The remote messaging client 150 may operate on a mobile device such as a smartphone or tablet computer, or may be a laptop computer, a desktop computer, or a telephone system with messaging capability.

The remote messaging client 150 may provide messaging operations in any of a variety of ways. The remote messaging client 150 may be, for example, and without limitation, an electronic mail application, a short-message-service (SMS) message application, a multimedia-message-service (MMS) message application, a group communication application, a telephone voicemail system application, a video-communication application, and so forth. The remote messaging client 150 may accept an address for a recipient, such as an e-mail address, a chat handle, a telephone number, a user name within a social network service, and so forth.

Figure 2:
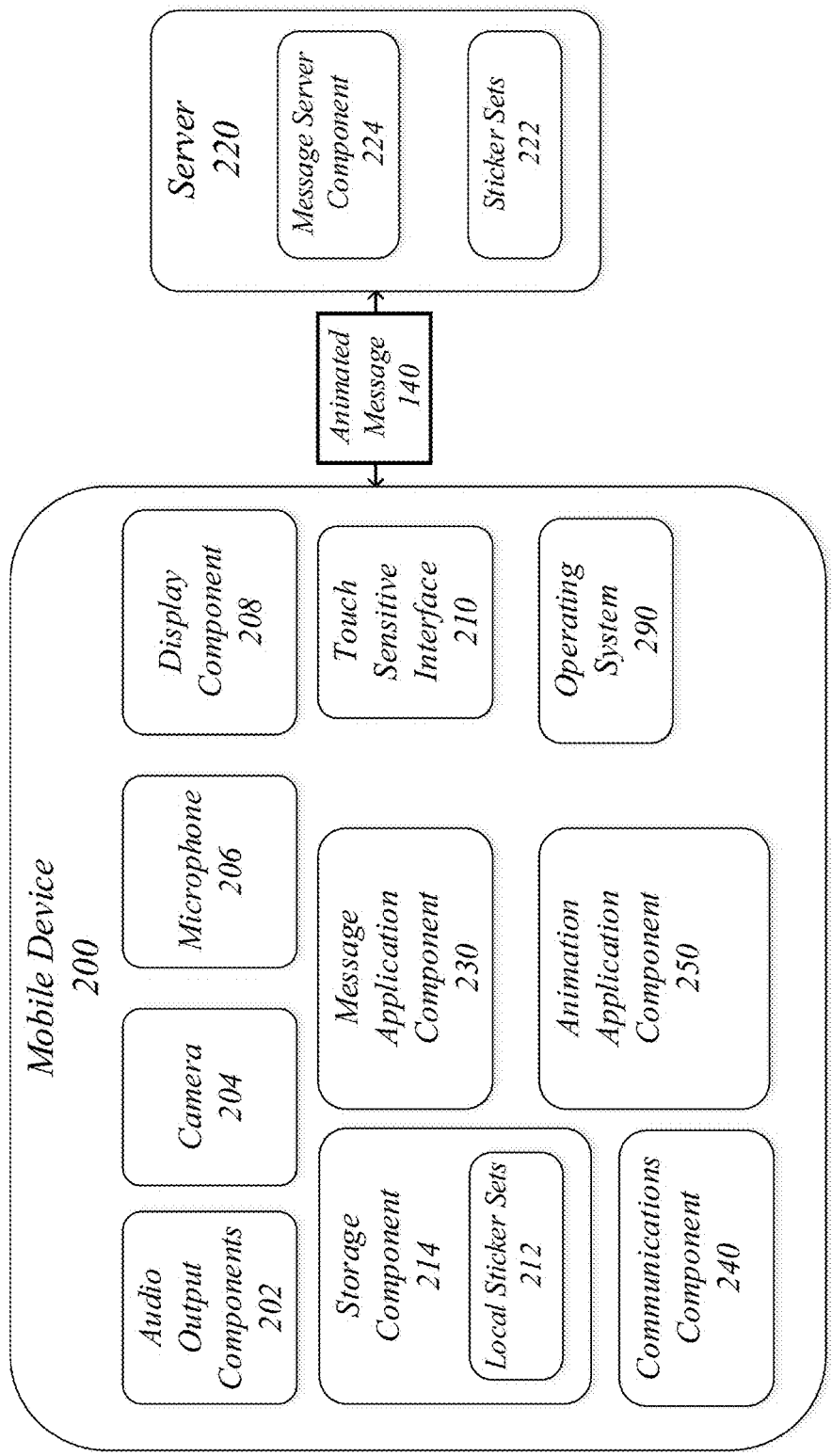
FIG. 2 illustrates an embodiment of a mobile device for the system of FIG. 1.

FIG. 2 illustrates a block diagram of a mobile device 200 and messaging server 220 for the system 100. The mobile device 200 may be an embodiment of mobile device 110. The mobile device 200 may include various hardware components and software components. The hardware components may include various audio output components 202, a camera 204, a microphone 206, a display component 208, and a touch sensitive interface 210. Other hardware components may also be included, such as various other input components, e.g. a keyboard or keypad, as well as a global positioning system (GPS) component, an altimeter, and so forth.

The audio output components 202 may include any components operative to output sound waves, such as an earpiece speaker, a loudspeaker, and/or an audio-out connection. The audio output components 202 may include hardware and/or software that converts between analog and digital sound data.

The camera 204 may be a camera integrated into the mobile device 200 that can take digital photographs through a lens and store the digital photos. In some embodiments, the camera 204 may use the display component 216 to display the scene that will be photographed, and to display stored photos.

The microphone 206 may be any device capable of receiving sound waves, e.g. spoken by a human operator, and converting the received sound waves into electrical signals and/or data that can be stored and transmitted to other devices. The microphone 206 may be integrated into the mobile device 200, or may be an external microphone coupled to the mobile device 200 wirelessly or through an external wired connection. The microphone 206 may be for example, a component of a head-set, earpiece, or other hands-free communication device that communicates with the mobile device 200 via a short-range signal technology such as BLUETOOTH® technology. The embodiments are not limited to this example.

The display component 208 may include any interface components capable of presenting visual information to the sender, such as, but not limited to, a screen for visual output.

The touch sensitive interface 210 may include a surface that detects touch from, for example, a human finger or a stylus, and converts the touch into a command directive. Various touch gestures that may be detected may include, for example, a single tap, a double tap, a circling gesture, a sliding gesture, a dragging gesture, a multiple-finger gesture, and so forth. The mapping of a touch gesture to a control directive may be dependent on the application operating on the mobile device 200 when the touch is detected, or may be independent of any application. In some embodiments, the display component 208 and the touch sensitive interface 210 may be integrated into one touch sensitive display screen.

The mobile device 200 may further include a storage component 214 in the form of one or more computer-readable storage media capable of storing data and instructions for the functions of software, such as a message application component 230, an animation application component 250, and an operating system 290. As used herein, "computer-readable storage medium" is not intended to include carrier waves, or propagating electromagnetic or optical signals.

The mobile device 200 may include various software components, such as a message application component 230 and an animation application component 250. The message application component 230 may comprise instructions that when executed by a processing circuit (not shown) cause the mobile device 200 to perform the operations of the message application component 230 as will be described herein. Generally, the message application component 230 may be provided on the mobile device 200 at the time of purchase, or may installed by the sender, and may enable the creation, communication, and playback of messages in a variety of formats, including, but not limited to, animated stickers, audio messages, text, and video.

The message application component 230 may allow the sender to communicate with others, e.g. with a recipient, by sending and receiving messages, including animated messages 140, in a manner analogous to text messaging. The message application component 230 may be a message application that uses alphanumeric text, such as a simple message service (SMS) application, or a social network application that allows its members to communicate with messages.

The animation application component 250 may display visual representations of sticker sets that can be selected by the sender for animation. A visual representation may be one of the images within a sticker set. The animation application component 250 may receive audio data, for example, as the operator speaks into a microphone. The animation application component 250 may analyze the energy levels of the received audio data as it is received. The images within a selected sticker set may be mapped to the energy levels and displayed sequentially while the audio data is received. In an embodiment, this mapping and displaying may be done apparently in real-time. That is, the sticker may appear, to a human operator, to move in synchronization with the energy levels of the incoming audio data. The combination of a sequence of images in a sticker set and audio data may be referred to herein as an animated sticker.

The animation application component 250 may allow a user to select one or more animated stickers to send as an animated message 140 via the message application component 230. An animated message 140 may include the data of the recorded audio, e.g. a data file of the audio data, and a selected sticker set. In some embodiments, the animated message 140 may include each image file in sequence as mapped to the energy levels of the associated audio data. In other embodiments, the sequence of images may be represented by identifiers of the images, which can be used by an animation server or a remote messaging client to re-create the animation remotely, without having to transmit each image file.

For example, the operator may speak, which may be recorded by the microphone 206. The recorded speech may be mapped to a set of images in a sticker set resulting in an animated message 140, which may be transmitted to the remote messaging client 150. The remote messaging client 150 may present the animated message 140, and may respond in kind using the remote messaging client 150.

The mobile device 200 may store some sticker sets on the device in the local sticker sets 212, e.g. in the storage component 214. A sticker set 212 may be a collection of related static images, referred to as animation frames, that, when presented at a particular frame rate on a display, appear as an animated image. The local sticker sets 212 may include animated stickers that were previously created and/or received, and/or sticker sets that have not been animated.

Accordingly, the message application component 230 and the animation application component 250 may operate to allow the user of the mobile device 200 to compose and/or record messages, e.g. an animated message 140, to send the message to a recipient, as well as to receive messages from others and present the animated messages to the user. In some embodiments, the message application component 230 and the animation application component 250 may be separate stand-alone applications. In other embodiments, the message application component 230 may include the animation application component 250. The animation application component 250 will be described in greater detail with respect to FIG. 3.

The mobile device 200 may include a communications component 240. The communications component 240 may include one or more hardware and/or software components that allow the transmission and receiving of signals by the mobile device 200. The communications component 240 may include the hardware and/or instructions to communicate on a data network, such as over a long-term evolution (LTE) network. The communications component 240 may include the hardware and/or instructions to communicate in a shorter-range network, such as by Wi-Fi or by BLUETOOTH®. The communications component 240 may include the hardware and/or instructions to communicate on a cellular telephone network, such as cellular system 130. The communications component 240 may support peer-to-peer network connections, and may be able to detect when other mobile devices are available for a peer-to-peer connection.

The system 100 may also include one or more servers 220. The server 220 may include any computing device capable of communication with other computing devices such as mobile device 110 and remote messaging client 150 over a network to exchange data and instructions. The server 220 may be embodied in a single device or with multiple devices.

The server 220 may store sticker sets 222. A sticker set 222 may be a collection of related static images that, when presented at a particular frame rate on a display, appear as an animated image. The sticker sets 222 may be available to all users of the animation application component. Some of the sticker sets 222 may be provided free of charge to the users, while others may have a fee associated with their use. In some embodiments, some of the sticker sets 222 may already be associated with a particular audio recording, while others may be unassociated with any audio recordings.

The server 220 may include a message server component 224. The message server component 224 may provide message storage and transmission operations for the messaging service. The operations of the message server component 224 are described in greater detail with respect to FIG. 4 below.

The mobile device 200 as shown in FIG. 2 is an example and is not limited to the components shown. More, fewer, or other components may be used to provide the described functionality. Additionally, some of the components may be combined into other functional units without departing from the concepts herein.

Figure 3:
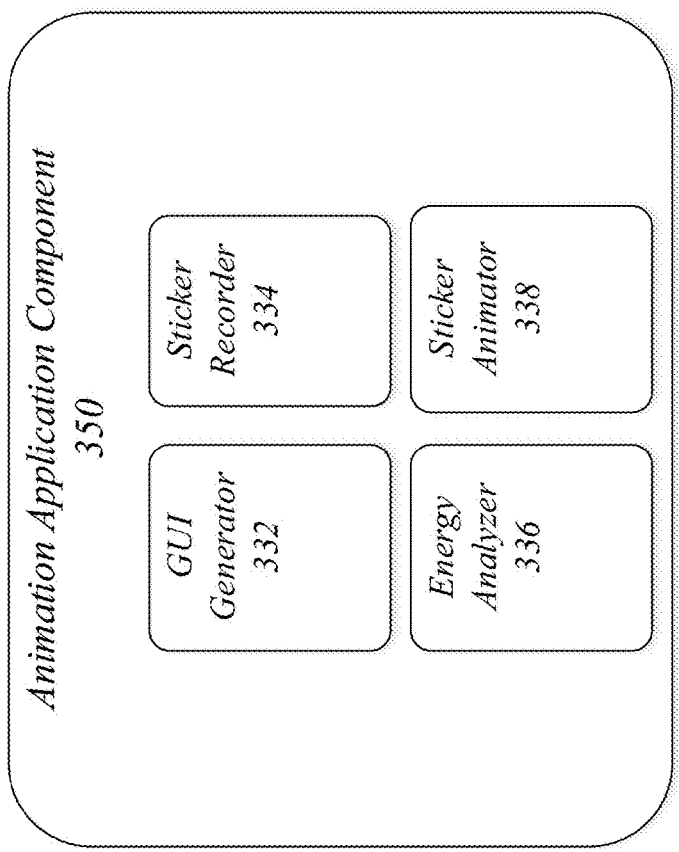
FIG. 3 illustrates an embodiment of a message application component for the system of FIG. 1.

FIG. 3 illustrates a block diagram of an animation application component 350 for the system 100. The animation application component 350 may be an embodiment of the animation application component 250. The animation application component 350 may include various functional components to perform the methods and operations described herein, such as, but not limited to, a graphical user interface (GUI) generator 332, a sticker recorder 334, an energy analyzer 336, and a sticker animator 338. More, fewer, or other components may be used to provide the described functionality.

The GUI generator 332 may present various visual elements that convey information to an operator of the device on which the animation application component 350 is executing. The visual components may also provide functionality when selected with a control directive, such as with a touch gesture.

In particular, the GUI generator 332 may present images representing a sticker set of animation frames that the operator can select and animate. The GUI generator 332 may receive a first control directive to select an image and may receive a second control directive to begin recording audio input. While the audio input is received, the GUI generator 332 may present an animated image created from the selected sticker set of animation frames and the received audio input.

The sticker recorder 334 may receive audio input in response to the second control directive from a microphone, e.g. the microphone 206, and may store the received audio input at least long enough to add the recorded audio to an animated message 140. The sticker recorder 334 may also be used to record and generate an audio file that can be made into an animated message.

The energy analyzer 336 may measure an energy level of the audio input. The energy level measurements may be made periodically or may be made substantially continuously. At periodic intervals, the energy analyzer 336 may determine a range of energy levels of previously received audio input over a period from a first past time to a present time. The periodic interval may be related or tied to an animation frame rate, for example and without limitation, 30 times per second, every tenth of a second, every 50 milliseconds, and so forth. The period used to determine the range of energy levels may be the same as the energy level measurements period or may be different. The energy level of the audio input may be measured in decibels, watts, or any unit that allows a differentiation between perceived "loud" and "quiet" sounds.

The energy analyzer 336 may divide the determined range of energy levels into a plurality of sub-ranges, and determine which sub-range corresponds to the measured energy level of the present audio input. In some embodiments, the energy analyzer 336 may normalize the determined range.

The sticker animator 338 may animate the selected image according to the energy levels of the audio input. The animation may occur concurrently the receiving of the audio input in such a way as to appear, to a human operator, that the image is moving in conjunction with the audio input. For example, the sticker animator 338 may map each animation frame in the set of animation frames to a different one of the sub-ranges. For a determined sub-range of the present audio input, the sticker animator 338 may select the animation frame that is mapped to the determined sub-range for output. The GUI generator 332 may present, at each periodic interval, the selected animated image in a sequence of selected animation frames concurrently with output of the present audio input. In some embodiments, the sticker animator 338 may be able to apply post-animation effects such as sound or voice distortion, background music, or other alterations to the audio input. Alternatively, or in addition, the post-animation effects may be provided by a remote server, such as server 220.

Figure 4:
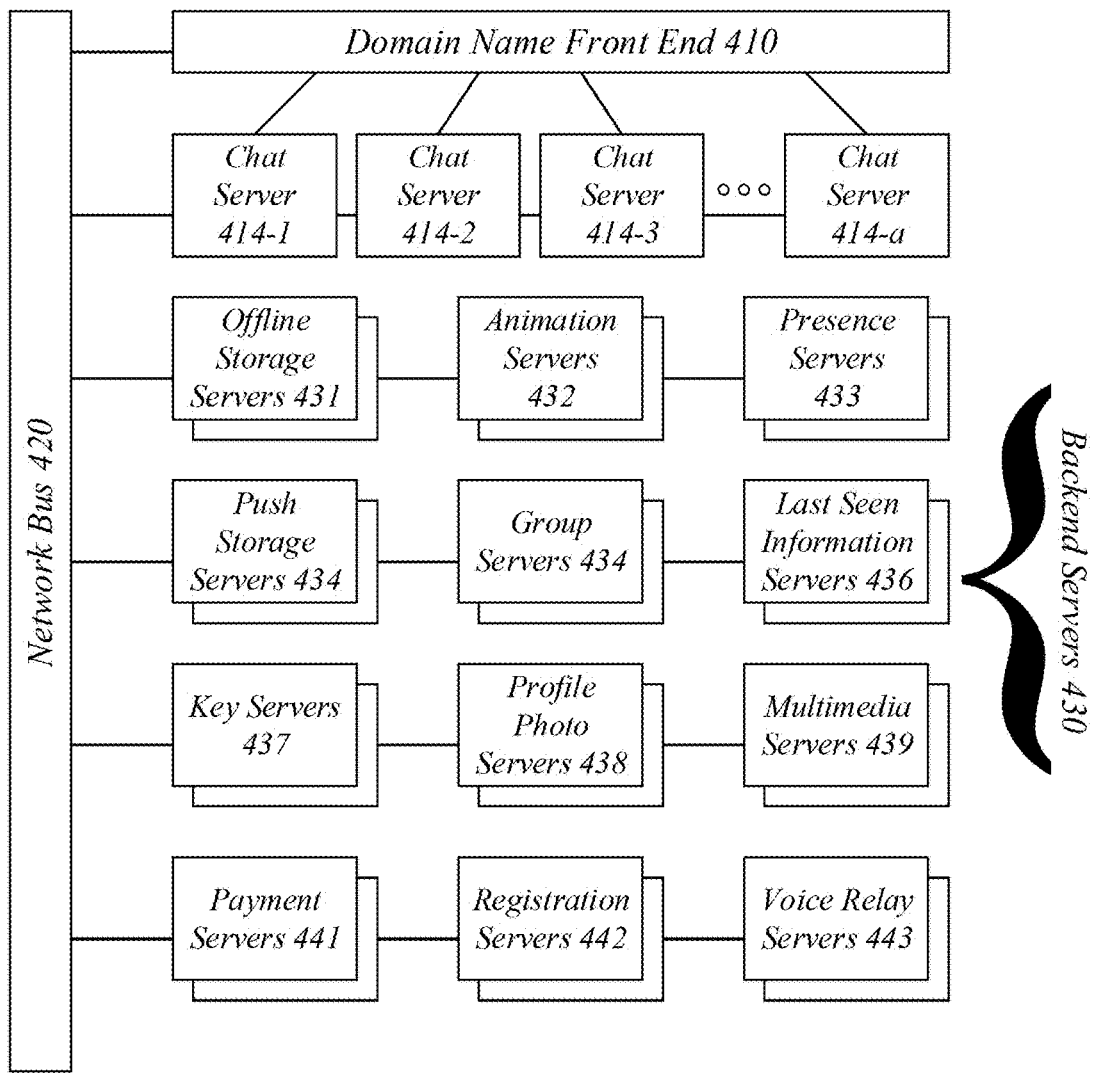
FIG. 4 illustrates an embodiment of a messaging system for the system of FIG. 1.

FIG. 4 illustrates an embodiment of a plurality of servers implementing various functions of a messaging system 400. It will be appreciated that different distributions of work and functions may be used in various embodiments of a messaging system 400. The messaging system 400 may be an embodiment of the message server component 224.

The messaging system 400 may comprise a domain name front end 410. The domain name front end 410 may be assigned one or more domain names associated with the messaging system 400 in a domain name system (DNS). The domain name front end 410 may receive incoming connections and distribute the connections to servers providing various messaging services.

The messaging system 400 may comprise one or more chat servers 414. The chat servers 414 may comprise front-end servers for receiving and transmitting user-to-user messaging updates such as chat messages and including animated messages 140. Incoming connections may be assigned to the chat servers 414 by the domain name front end 410 based on workload balancing.

The messaging system 400 may comprise backend servers 430. The backend servers 430 may perform specialized tasks in the support of the chat operations of the front-end chat servers 414. A plurality of different types of backend servers 430 may be used. It will be appreciated that the assignment of types of tasks to different backend serves 430 may vary in different embodiments. In some embodiments some of the backend services provided by dedicated servers may be combined onto a single server or a set of servers each performing multiple tasks divided between different servers in the embodiment described herein. Similarly, in some embodiments tasks of some of dedicated back-end servers described herein may be divided between different servers of different server groups.

The messaging system 400 may comprise one or more offline storage servers 431. The one or more offline storage servers 431 may store messaging content for currently-offline messaging endpoints in hold for when the messaging endpoints reconnect.

The messaging system 400 may comprise one or more animation servers 432. The one or more animation servers 432 may include one or more sticker sets for use by message application components 330. Sticker sets may include, for any particular set, two or more images, also referred to as animation frames. A sticker set may be represented by one of the images in the set. The animation servers 432 may present a representative image for a sticker set in an interface of a message application component to allow an operator to select a sticker set for animation.

The one or more animation servers 432 may allow users of the messaging system 400 to create their own animated stickers, and to send the animated sticker to other users. In some embodiments, the animation servers 432 may perform some or all of the animation operations. For example, the animation servers 432 may receive a selection of a sticker set, the recorded audio data, and the analyzed energy data, and may map the images in the sticker set to the audio data. The audio data and the mapped sequence of images may be saved as an animated sticker.

In some embodiments, the animation servers 432 may provide enhancements to an animated sticker. For example, the animation servers 432 may modify an animated sticker with audio distortion effects and/or with image distortion effects. An audio distortion effect may include, for example, changing the pitch or frequency of the audio data, adding sound effects or music, or any other change to the audio portion of an animated sticker. Image distortion effects may include, for example, changing colors or apparent lighting, adding a flashing or strobe effect, and so forth.

The messaging system 400 may comprise one or more presence servers 433. The one or more presence servers 433 may maintain presence information for the messaging system 400. Presence information may correspond to user-specific information indicating whether or not a given user has an online messaging endpoint and is available for chatting, has an online messaging endpoint but is currently away from it, does not have an online messaging endpoint, and any other presence state.

The messaging system 400 may comprise one or more push storage servers 434. The one or more push storage servers 434 may cache push requests and transmit the push requests to messaging endpoints. Push requests may be used to wake messaging endpoints, to notify messaging endpoints that a messaging update is available, and to otherwise perform server-side-driven interactions with messaging endpoints.

The messaging system 400 may comprise one or more group servers 434. The one or more group servers 434 may maintain lists of groups, add users to groups, remove users from groups, and perform the reception, caching, and forwarding of group chat messages.

The messaging system 400 may comprise one or more last seen information servers 436. The one or more last seen information servers 436 may receive, store, and maintain information indicating the last seen location, status, messaging endpoint, and other elements of a user's last seen connection to the messaging system 400.

The messaging system 400 may comprise one or more key servers 437. The one or more key servers 437 may host public keys for public/private key encrypted communication.

The messaging system 400 may comprise one or more profile photo servers 438. The one or more profile photo servers 438 may store and make available for retrieval profile photos for the plurality of users of the messaging system 400.

The messaging system 400 may comprise one or more multimedia servers 439. The one or more multimedia servers 439 may store multimedia (e.g., images, video, audio) in transit between messaging endpoints, and multimedia cached for offline endpoints, and may perform transcoding of multimedia.

The messaging system 400 may comprise one or more payment servers 441. The one or more payment servers 441 may process payments from users. Payments may be received, for example, when one or more animated stickers are purchased, and/or when a connection to a cellular data network is purchased. The one or more payment servers 441 may connect to external third-party servers for the performance of payments.

The messaging system 400 may comprise one or more registration servers 442. The one or more registration servers 442 may register new users of the messaging system 400.

The messaging system 400 may comprise one or more voice relay servers 443. The one or more voice relay servers 443 may relay voice-over-internet-protocol (VoIP) voice communication between messaging endpoints for the performance of VoIP calls.

The messaging system 400 may include an authorization server (or other suitable component(s)) that allows users to opt in to or opt out of having their actions logged by the animated messaging system 100 or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of the animated messaging system 100 and other elements of a social-networking system through blocking, data hashing, anonymization, or other suitable techniques as appropriate.

Figure 5:
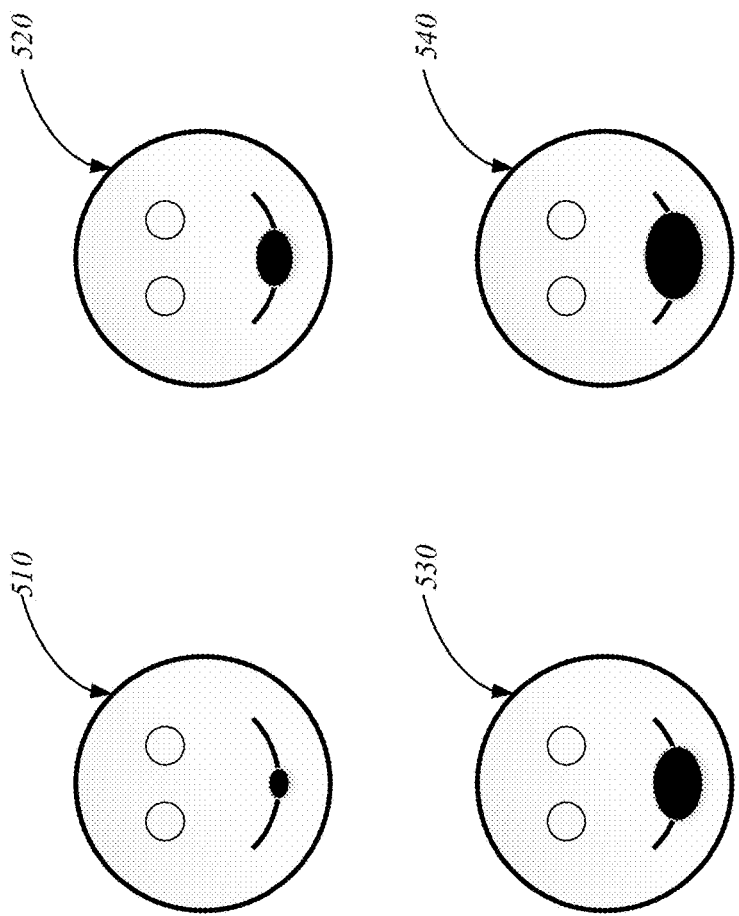
FIG. 5 illustrates an embodiment of an image set for the system of FIG. 1.

FIG. 5 illustrates an embodiment of a set of animation frames 500 in a sticker set for the system of FIG. 1. A set of animation frames may comprise two or more static images that, when presented in succession at a specific frame rate on a display, appear to be a moving image, also referred to herein as an animated image or animated sticker. As illustrated in FIG. 5, a set of animation frames may include four images: image 510, image 520, image 530, and image 540. More or fewer images may be used in a set of animation frames.

Each image may differ in some respect from the other images in the set. For example, in the set of animation frames 500, the images differ in a size of a mouth opening. Images in a set of animation frames may vary in other ways, for example, and without limitation, in a position within a frame border, in eye size opening, in facial expression, or any other variations that create animation when presented at a frame rate. Images in a set of animation frames may vary in multiple ways simultaneously, for example, both the size of the mouth opening and the size of the eye opening may change from image to image.

Each sticker set may have an associated identifier to distinguish it from other sticker sets available from a messaging service. Each image in a sticker set may have an associated identifier. The identifier may be unique within the sticker set, or may be unique among all of the sticker sets available through a messaging service. Additionally, each image in the sticker set may include information that indicates whether it should be mapped to a lower energy level or a higher energy level. The images within a sticker set may, accordingly, have an ordering relative to each other in the energy levels that they represent.

Figure 6:
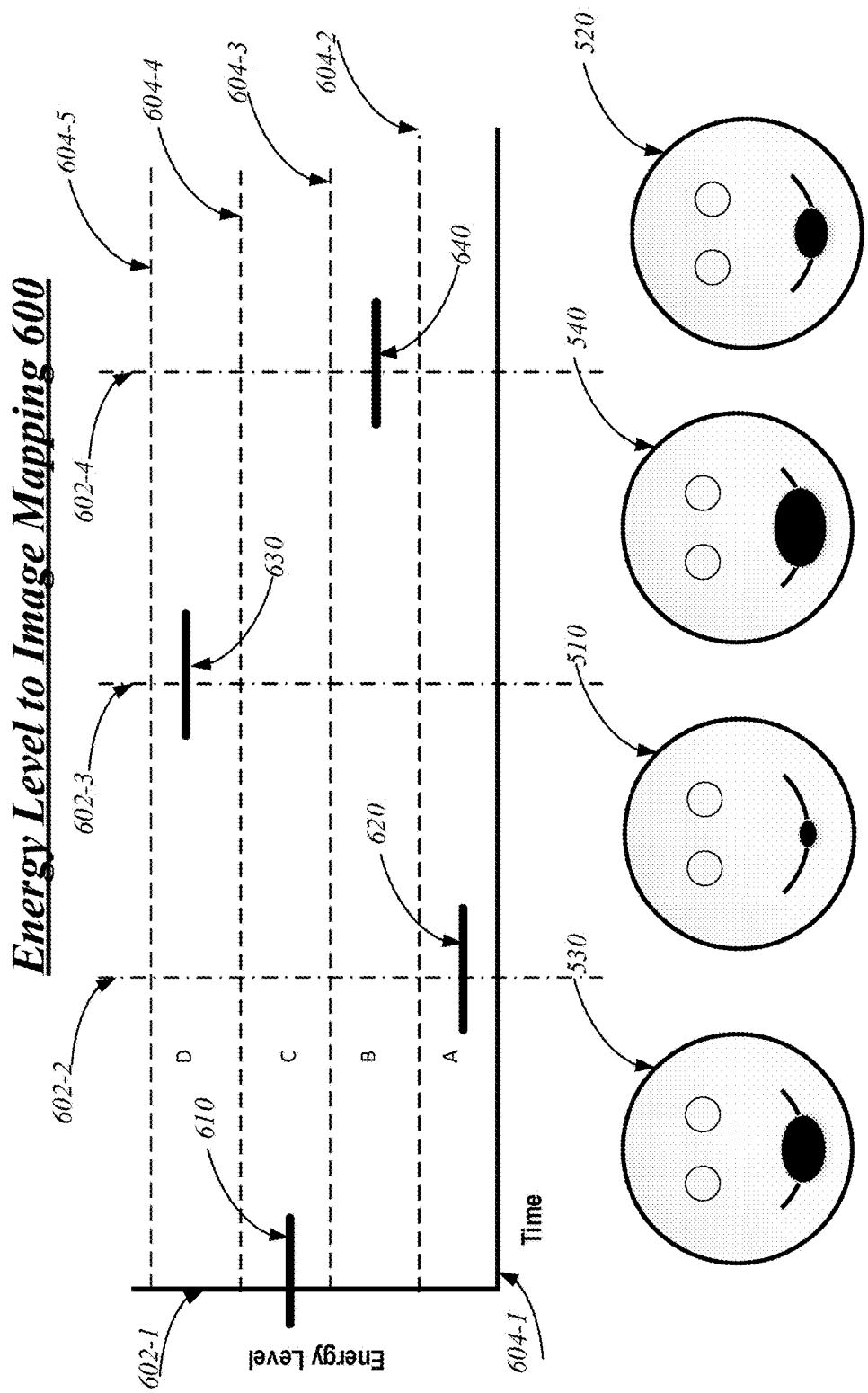
FIG. 6 illustrates an embodiment of a mapping of energy level to images for the system of FIG. 1.

FIG. 6 illustrates an embodiment of a mapping 600 of energy level to images for the system of FIG. 1. The mapping 600 illustrates a simplified animation of the animation frames shown in FIG. 5.

As shown in FIG. 6, energy level measurements 610, 620, 630 and 640 are shown on a graph. Time is represented by the X-axis, and energy level is represented by the Y-axis. Assume, for the purpose of demonstration, that a range of energy levels was determined from previously received recent audio input, e.g. from the past quarter of a second. The range of energy levels is represented as the energy level range between horizontal lines 604-1 and 604-5. Because there are four animation frames in the selected sticker set, the range is divided into four sub-ranges, represented as the range between the following pairs of horizontal lines: 604-1 to 604-2 (range A), 604-2 to 604-3 (range B), 604-3 to 604-4 (range C), and 604-4 to 604-5 (range D).

Periodic intervals are represented by vertical lines 602-1, 602-2, 602-3, and 602-4. At each periodic interval, the energy analyzer 336 may measure the energy level of the current audio input. The sticker animator 338 may receive the measured energy level 610 from the energy analyzer 336, and may determine in which of the four sub-ranges the measured energy level 610 falls. Alternatively, the energy analyzer 336 may provide the sub-range to the sticker animator 338. In this example, the measured energy level 610 falls in sub-range C.

The sticker animator 338 has mapped the four images 510, 520, 530, and 540 to the four sub-ranges A, B, C, and D, respectively. Upon the determination that the measured energy level 610 is in sub-range C, the sticker animator 338 selects image 530 as the next image in the animation sequence. The image 530 may be output by the GUI generator 332. The image 530, or an identifier for image 530, may be stored in a sequence for later output.

The process may repeat at periodic interval 602-2. At this interval, the measured energy level 620 is lower, and falls in sub-range A. Image 510 is selected for output because image 510 is mapped to sub-range A.

The process may repeat at periodic interval 602-3. At this interval, the measured energy level 630 is higher, and falls in sub-range D. Image 540 is selected for output because image 540 is mapped to sub-range D.

The process may repeat at periodic interval 602-4. At this interval, the measured energy level 640 is lower, and falls in sub-range B. Image 520 is selected for output because image 520 is mapped to sub-range B.

When the sequence of images 530, 510, 540, and 520 are output at a suitable frame rate, the mouth size of the image appears to the human operator to open larger or smaller in conjunction with a change in the loudness of the audio input.

While the illustrated example includes a sticker set having four animation frames, and uses four sub-ranges, more or fewer animation frames and sub-ranges may be used.

Figure 7:
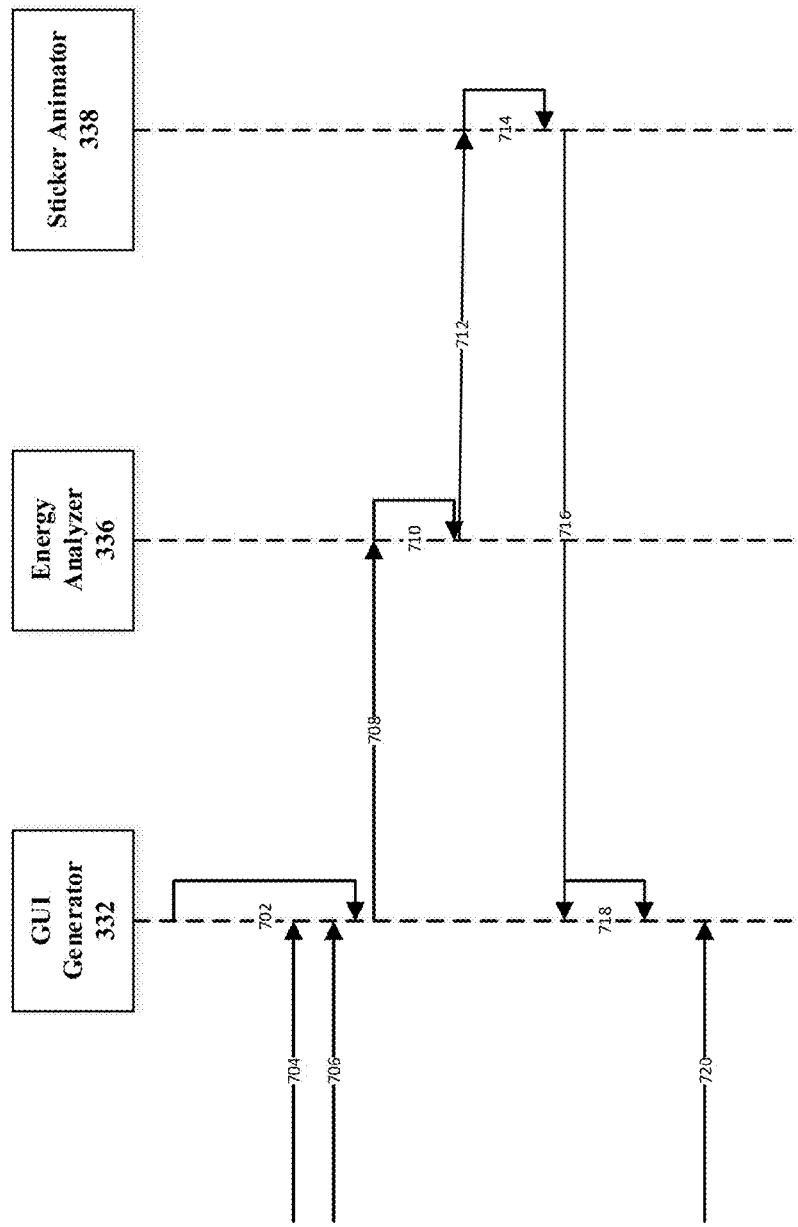
FIG. 7 illustrates an embodiment of a message flow for the system of FIG. 1.

FIG. 7 illustrates a message flow diagram 700 for the system 100. The message flow 700 may represent messages communicated among the components of system 100. As used in FIG. 7, a "message" may include data and/or instructions communicated from one component to another, as well as internal functions within a component. In particular, the message flow 700 may occur among the components of the mobile device 110, 200, and more particularly, among the components of the animation application component 350.

In message flow 700, time flows from the top of the diagram toward the bottom. Message flow 700 may represent messages communicated when an operator creates an animated sticker using mobile device 110.

The message flow 700 begins when the GUI generator 332 presents sticker images, in message 702. The GUI generator 332 may present one or more static images in a section of the display component, where each static image represents a different sticker set. The static image may be one of the animation frames in the sticker set.

The message flow 700 continues when the GUI generator 332 receives a control directive selecting a sticker image, in message 704. The operator may, for example, touch a sticker image with a finger tip or stylus, use a spoken command to select a specific sticker image, or use any other available input mechanism to indicate a selection of one sticker image. The GUI generator 332 may update a UI view to show the selected sticker image, for example, in a larger size and/or in a separate section of the display component.

The message flow 700 continues when the GUI generator 332 receives a second control directive to begin recording audio input, in message 706. For example, the operator may select a "record" UI element. In some embodiments, the first control directive of message 704 may also cause the microphone to begin receiving and recording audio input, without a second control directive.

The message flow 700 continues when the GUI generator 332 causes the energy analyzer 336 to begin receiving the audio input, in message 708. In some embodiments, the energy analyzer 336 may automatically begin receiving the audio input as soon as the microphone is active, while the animation application component 350 is executing on the mobile device.

The message flow 700 continues as the energy analyzer 336 measures the audio input to determine a range of energy levels, in message 710. The energy analyzer 336 may measure the energy level of audio input at a current time, and may store past measurements. The energy analyzer 336 may, for example, store the last one second's worth of energy level measurements. More or fewer energy level measurements may also be stored. In some embodiments, the energy analyzer 336 may only store a highest and lowest measured energy level in order to determine the range of energy levels. The energy analyzer 336 may normalize the determined range, in order to make the high and low values consistent over the time of the animation.

Determining the range of energy levels may also include dividing the range into two or more sub-ranges. The number of sub-ranges may match the number of animation frames in the selected sticker set.

The message flow 700 continues as the energy analyzer 336 provides the measured energy levels to the sticker animator 338, in message 712. The energy level 336 may send the message 712 at periodic intervals, for example, at a period that corresponds to a frame rate of the animation. The message 712 may also include information about the sub-ranges. For example, the message 712 may include the top and bottom energy levels of each sub-range, or may include an identification of which sub-range the current energy level measurement falls into. Messages 710 and 712 may repeat until no more audio input is received.

The message flow 700 continues when the sticker animator 338 selects an animation frame, in message 714. In some embodiments, the message 712 may include an indication of a sub-range in the range of energy levels that a current energy level measurement falls into. In other embodiments, the message 712 may include the energy level measurement. The sticker animator 338 may have a mapping of animation frames in the selected sticker set to the subranges of measured energy levels. The sticker animator selects the animation frame that maps to the sub-range of the measured energy level provided in the message 712.

The message flow 700 continues when the sticker animator 338 provides the selected animation frame to the GUI generator 332, in message 716. The sticker animator 338 may provide an identifier of which animation frame to present, or may provide the actual animation frame image file to the GUI generator 332. The sticker animator 338 may also store a sequence of selected animation frames in order to reproduce the animation subsequently.

The message flow 700 continues when the GUI generator 332 presents the animation frame, in message 718. The animation frame may be presented visually in a section of the display component.

The message flow 700 continues until a control directive is received to end receiving audio input, in message 720. The operator may, for example, press a "stop" UI element, release a pressed "record" UI element, slide a fingertip away from a "record" UI element, or simply stop speaking for a specified period of time.

The messages 708, 710, 712, 714, 716, and 718 are repeated until the message 720 is received. Presentation of the animation frames in message 718 may occur at a frame rate such that the animation appears to a human observer to be continuous smooth movement, rather than a series of distinct still images. The frame rate may be, for example and without limitation, 18 frames per second (fps), 30 fps, 48 fps, or any other rate that creates a continuous smooth movement visual effect.

Figure 8:
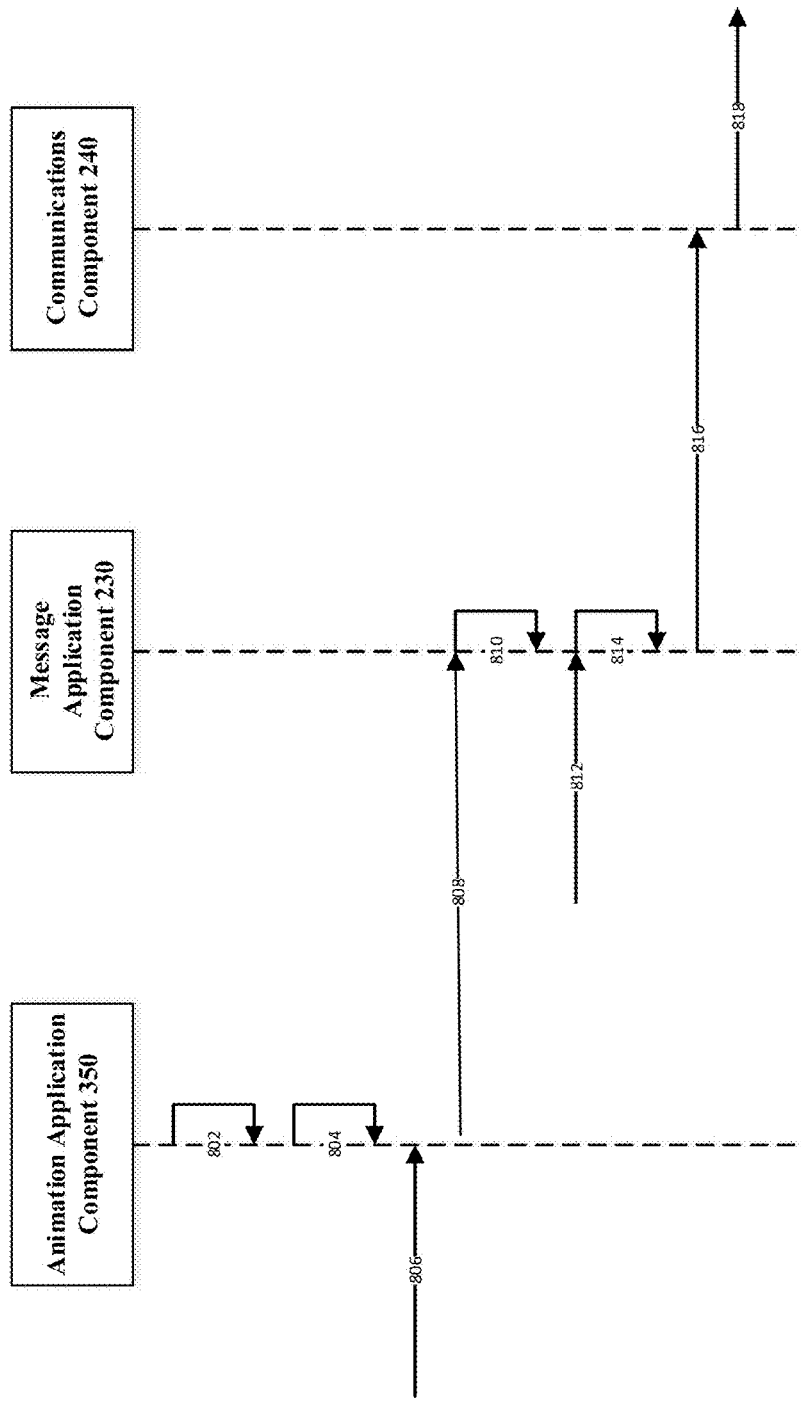
FIG. 8 illustrates an embodiment of a second message flow for the system of FIG. 1.

FIG. 8 illustrates an embodiment of a message flow 800 for the system 100. 100. The message flow 800 may represent messages communicated among the components of system 100. As used in FIG. 8, a "message" may include data and/or instructions communicated from one component to another, as well as internal functions within a component, and is distinct from the animated messages 140 sent from a sender to a recipient. In particular, the message flow 800 may occur among the components of the mobile device 110, 200.

In message flow 800, time flows from the top of the diagram toward the bottom. Message flow 800 may represent messages communicated during a message communication session where a sender selects an animated sticker to send. The message flow 800 assumes that the animation application component 350 is executing on the mobile device 110, 200. The message flow 800 may begin when the message flow 700 ends.

The message flow 800 begins when the animation application component 350 presents an animated sticker, in message 802. For example, the animation application component 350 may present a static image representing the animated sticker on a display component of the mobile device. A playback UI element may be presented on or near the static image. Alternatively, presenting the animated sticker may include outputting the audio data to an audio output, and simultaneously presenting the animation frames on the display component in the sequence specified by the animated sticker at a specified frame rate.

The message flow 800 continues when the animation application component 350 presents options related to the animated sticker, in message 804. For example, the GUI generator 332 of the animation application component 350 may present UI elements on the display component for various operations, including, but not limited to, saving the animated sticker, deleting the animated sticker, sending the animated sticker as a message, or adding effects to the animated sticker.

The message flow 800 continues when the animation application component 350 receives a control directive to send the animated sticker as an animated message, in message 806. For example, the operator may touch a "send" UI element with a fingertip or stylus, may speak a "send" command into a microphone, or use any other input mechanism to select the "send" operation.

The message flow 800 continues when the animation application component 350 instructs the message application component 230 to create an animated message, in message 808. The message 808 may include a "new message" command, and may include links to one or more data files that comprise the animated sticker. The message 808 may alternatively include the actual one or more data files that comprise the animated sticker. The one or more data files that comprise the animated sticker may be a single data file that can be played analogously to a video file. In other embodiments, the one or more data files may include a more deconstructed version of the animated sticker comprising an audio file, the animation frames or identifiers for the animation frames, and sequence data that specifies an order in which to present the animation frames.

The message flow 800 continues when the message application component 230 presents a message composition user interface, in message 810. The message composition UI may present, on the display component, UI elements for selecting a recipient, and/or for adding additional content to the message, such as text. The embodiments are not limited to these examples.

The message flow 800 continues when the message application component 230 receives message input, in message 812. The message input may include one or more selected recipients, as well as any additional content.

The message flow 800 continues when the message application component 230 constructs the animated message, in message 814. The animated message may be in the form of a data packet that includes fields to hold the one or more data files that comprise the animated sticker and a destination for the animated message, e.g. a telephone number, network address, e-mail address and so forth.

The message flow 800 continues when the message application component 230 provides the animated message to the communications component 240 in message 816. In some embodiments, the message application component 230 may pass the animated message to the communications component 240. In other embodiments, the message application component 230 may store the animated message and may provide a storage location to the communications component 240 to enable the communications component 240 to retrieve the animated message. The embodiments are not limited to these examples.

The message flow 800 continues when the communications component 240 sends the animated message to the recipient, in message 818. The communications component 240 may use any available data network to send the animated message.

Figure 9:
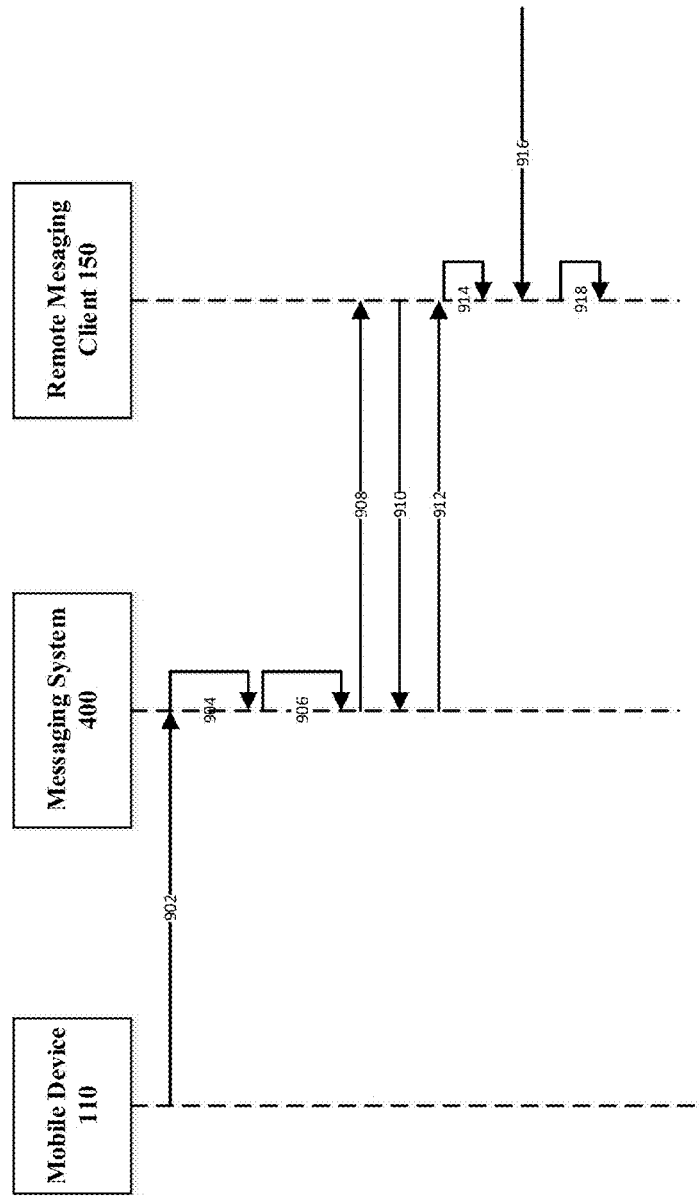
FIG. 9 illustrates an embodiment of a third message flow for the system of FIG. 1.

FIG. 9 illustrates of a message flow 900 for the system 100. The message flow 900 may represent messages communicated among the components of system 100. As used in FIG. 9, a "message" may include data and/or instructions communicated from one component to another, as well as internal functions within a component, and is distinct from the animated messages 140 sent from a sender to a recipient.

In message flow 900, time flows from the top of the diagram toward the bottom. Message flow 900 may represent messages communicated during a message communication session where an animated message is sent to and received by a mobile device. The message flow 900 assumes that the animation application component 350 is executing on the mobile device 110, 200.

The message flow 900 may begin when the remote messaging client 150 sends an animated message 140 to the messaging system 400 in message 902. The animated message 140 included in message 902 may include an address field, the audio component of the animated sticker, and the animation frames or identifiers of the animation frames, along with a sequence in which to present the animation frames. The message 902 may also include a request or command to apply one or more after effects to the animated sticker.

The message flow 900 may continue when the messaging system 400 applies any requested after effects, in message 904. For example, the messaging system 400 may alter one or more characteristics of the audio file, or add sound effects to the audio data.

The message flow 900 may continue when the messaging system 400 stores the animated message in message 906. Storing the animated message may allow the intended recipient to retrieve the animated message at a later time, for example, if the recipient is not online or otherwise connected to the messaging system 400 when the animated message is sent.

The message flow 900 may continue when the messaging system 400 sends a message notification to the remote messaging client 150, in message 908. The message 908 may cause the remote messaging client 150 to present an audio and/or visual alert that an animated message is available for the recipient.

The message 908 may include a link or retrieval instruction that, when selected, causes the remote messaging client 150 to request the animated message in message 910.

The message flow 900 may continue when the messaging system 400 sends the animated message to the remote messaging client 150 in message 912. In some embodiments, the message 912 may include the animated sticker as a single data file. In other embodiments, the message 912 may include a more deconstructed version of the animated sticker comprising the audio file, the animation frames or identifiers for the animation frames, and sequence data that specifies an order in which to present the animation frames.

In some embodiments, the message 912 may be sent without using the notification process of messages 908 and 910.

The message flow 900 may continue when the remote messaging client 150 presents the animated message, in message 914. In some embodiments, a static image representing the animated sticker may be displayed near a playback UI element.

The message flow 900 may continue when the remote messaging client 150 receives a control directive selecting to play the received animated sticker, in message 916. For example, the operator of the mobile device 110, 200 may touch the playback UI element, or may speak a command, e.g. "play message" into the microphone 206.

The message flow 900 may continue when the remote messaging client 150 presents the animated sticker, in message 918. Presenting the animated sticker may comprise outputting the audio data to an audio output, and simultaneously presenting the animation frames on a display component in the sequence specified in the animated message at a specified frame rate.

Figure 10:
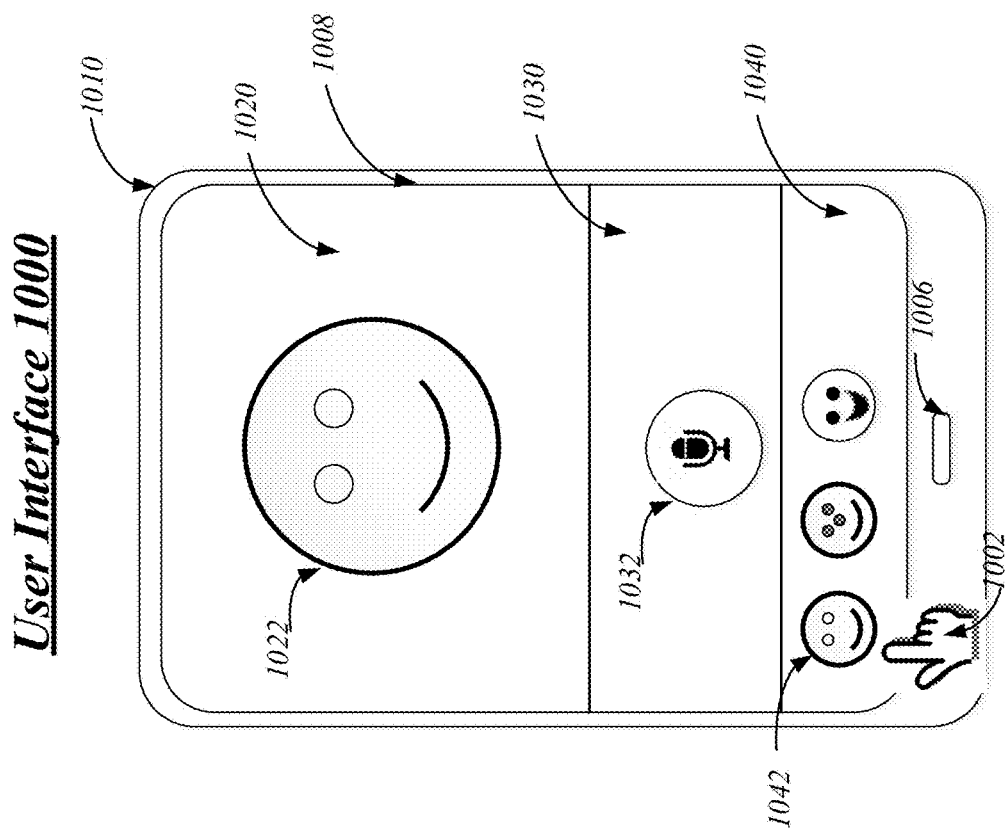
FIG. 10 illustrates a diagram of a user interface for the system of FIG. 1.

FIG. 10 illustrates a user interface (UI) 1000 for the system 100. UI 1000 may be presented on a display component 1008 of mobile device 1010, which may be embodiments of display component 208 and mobile device 110, respectively. In the illustrated example, the UI 1000 is for an animation application, such as for animation application component 250, 350. The display component 1008 in the illustrated component may be a touch-sensitive screen.

The UI 1000 may represent a landing screen for the messaging app. The UI 1000 may include one or more sections. For example, the UI 1000 may divide the display area of display component 1008 into sections 1020, 1030 and 1040. More, fewer or different sections may also be used.

Section 1020 may display a graphical representation 1022 of a selected sticker for animation. Section 1030 may display one or more functional UI elements that enable the creation of an animated sticker and/or sending a message. In the illustrated example, section 1030 displays a record icon 1032. In some embodiments, the sender may touch or tap the record icon 1032 to activate the microphone 1006, and then speak his message into the microphone 1006. As shown in FIG. 10, no animation operations have occurred.

Section 1040 may display visual representations of sticker sets, such as representation 1042. The sender may perform one or more touch gestures using his finger 1002 to select a representation for animation. For example, the sender may tap the representation 1042, or touch and drag the representation 1042 to section 1020 to select it. If a different sticker set is desired, the sender may select a different representation from section 1040. The embodiments are not limited to these examples.

Figure 11:
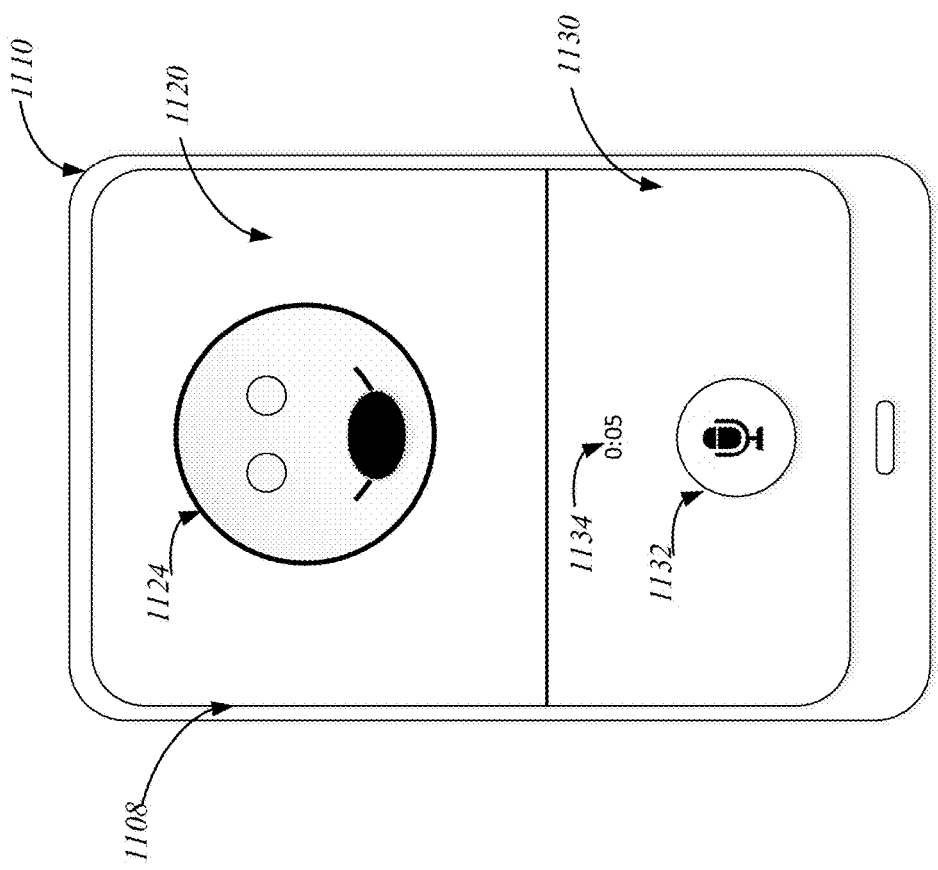
FIG. 11 illustrates a diagram of a second user interface for the system of FIG. 1.

FIG. 11 illustrates a user interface (UI) 1100. The UI 1100 may be presented on a display component 1108 of mobile device 1110, which may be embodiments of display component 208 and mobile device 110, respectively. The UI 1100 may be very similar to the UI 1000 and/or may be the UI 1000 in a different state. For example, the sections 1120 and 1130 may be analogous to sections 1020 and 1030, respectively. The record icon 1132 may be the same or analogous to the record icon 1032.

In the illustrated example, the operator of the mobile device 1110 has begun recording audio data to use in animating the selected sticker. A timer UI element 1134 may show an elapsed time from the beginning of the audio recording. While audio data is received, the animation frames that make up the selected sticker set are displayed according to a measured energy level of the audio data. The sequence of animation frames is presented as animated sticker 1124. The operator of the mobile device 1110 can view, as he or she speaks, the animation of the sticker set according to the audio data being received. In an embodiment, the recording of audio data and the animation of the sticker set may end when the operator generates a control directive to stop. For example, the operator may release the record icon 1132, drag a finger or stylus away from the record icon 1132, tap a separate "stop" UI element (not shown), stop speaking for a predetermined period of time, or any other method of indicating that the recording and animating is to stop.

Figure 12:
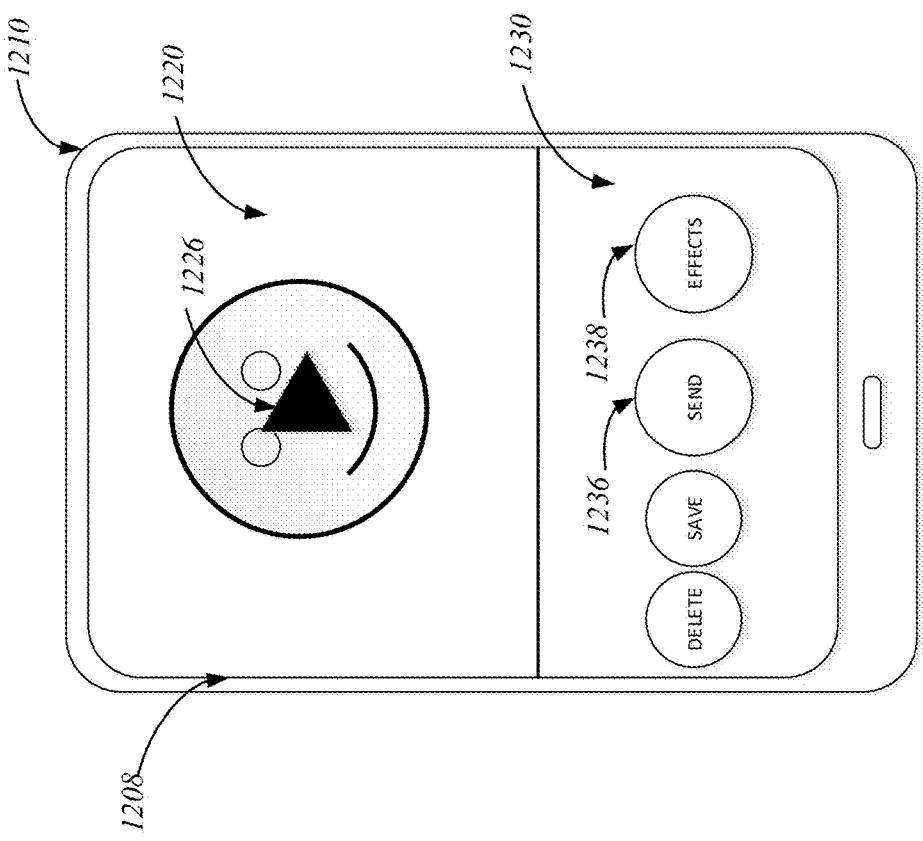
FIG. 12 illustrates a diagram of a third user interface for the system of FIG. 1.

FIG. 12 illustrates a user interface (UI) 1200. The UI 1200 may be presented on a display component 1208 of mobile device 1210, which may be embodiments of display component 208 and mobile device 110, respectively. In the illustrated example, the UI 1200 is for an animation application, such as for animation application component 250, 350. The UI 1200 may reflect a change to the UI 1100 after recording and animating have stopped.

For example, the UI 1200 may present, in section 1220, a static graphical representation of the animated sticker with a playback UI element 1226 that, when selected, presents the animated sticker to the operator, for example, as a preview.

The UI 1200 may provide various options in the section 1230. For example, the operator of the mobile device 1210 may use a touch gesture or other control directive to select a send UI element 1236. A selection of the send UI element 1236 may open an addressing UI component to allow the operator to select one or more recipients. In some embodiments, when the operator is already in a communication session with another user, the send UI element 1236 may automatically send the animated sticker as a message to the other user The operator of the mobile device 1210 may use a touch gesture or other control directive to select an effects UI element 1238. A selection of the effects UI element 1238 may open a selection dialog that allows the operator to select one or more after-effects to apply to the animated sticker, for example, various voice distortion effects.

In addition, the operator may save the animated sticker to a storage medium. A stored animated sticker may be viewed or sent later. The operator may delete the animated sticker, removing the audio data and any information about the particular sequence of animation frames used in the animation. The sticker set itself may be retained in the local sticker sets 212.

Figure 13:
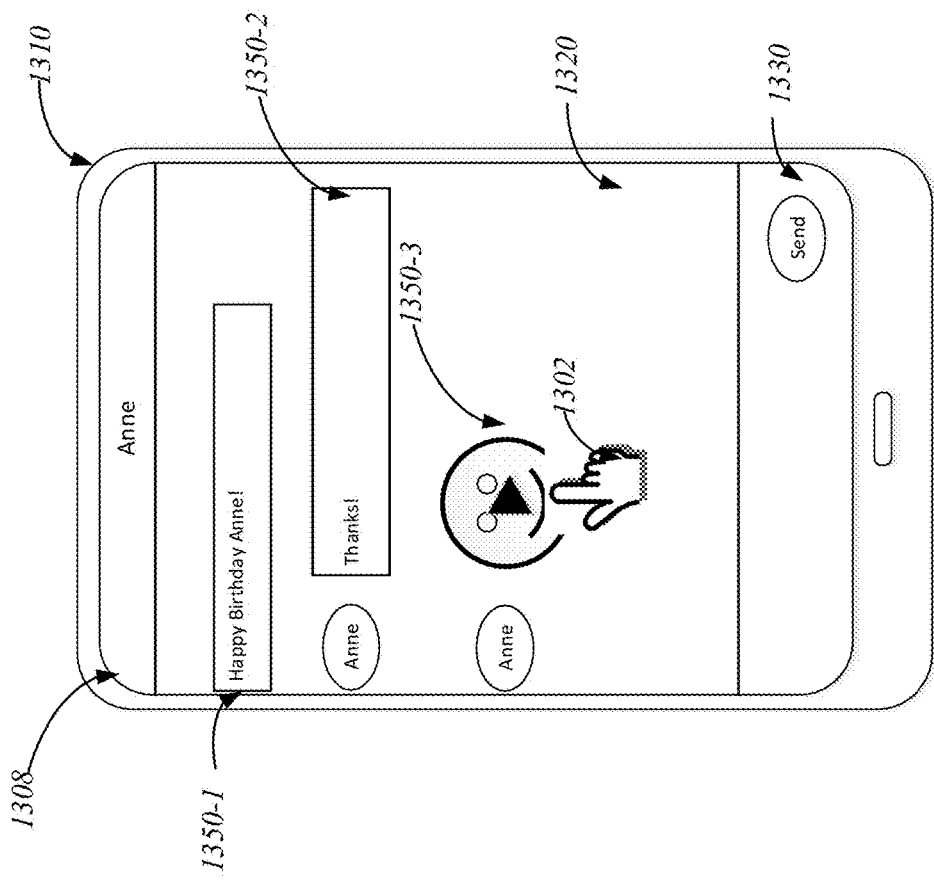
FIG. 13 illustrates a diagram of a fourth user interface for the system of FIG. 1.

FIG. 13 illustrates a user interface (UI) 1300. The UI 1300 may be presented on a display component 1308 of mobile device 1310, which may be embodiments of display component 208 and mobile device 110 or 150, respectively. In the illustrated example, the UI 1300 is for a messaging app, such as for the messaging application component 230.

The UI 1300 may divide the display component 1308 into several sections. For example, the display component 1308 may be divided into section 1320 and section 1330. More, fewer or other sections may be used.

Section 1320 may be used to present the messages exchanged between the operator 1302 of the mobile device 1310 and another device, in this example, a device operated by "Anne." In the illustrated example, the presented messages include messages 1350-1, 1350-2, and 1350-3.

The section 1330 may provide a message composition area, where the operator 1302 may input a touch gesture control directive to input text for a message. The touch gesture control directive may, for example, bring up a touch-sensitive keyboard display for text entry, or may activate a microphone for speech-to-text entry, or may accept input from a stylus and perform optical character recognition on handwriting from the stylus.

As shown, the messages 1350-1 and 1350-2 are conventional text messages. Messages may also include, for example, and without limitation, audio messages, images, video clips, links to web pages, and so forth. The message 1350-3 includes an animated sticker, sent by Anne to the device 1310. The message 1350-3 may be displayed with an indication that the message is not static, for example, with a "play" UI element. When operated on by the operator 1302, the animated message may be played within the section 1320.

Figure 14:
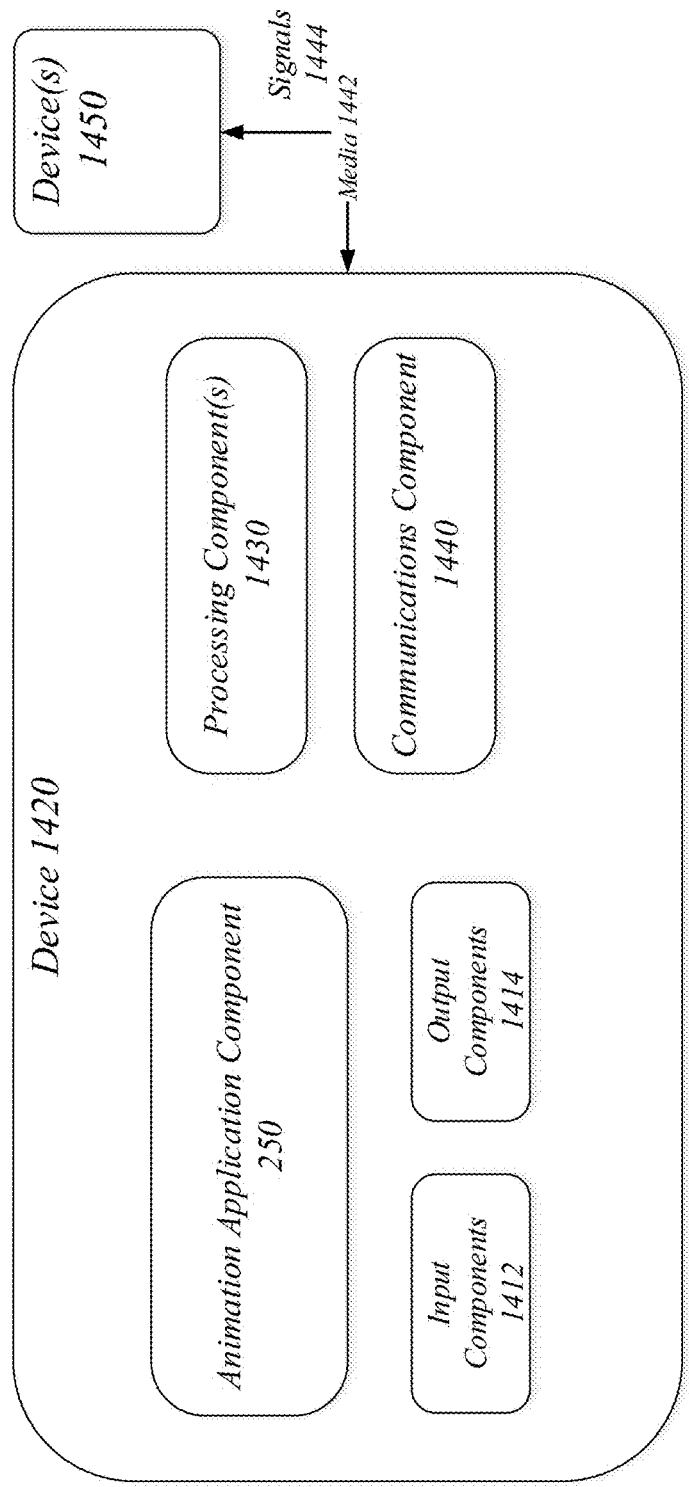
FIG. 14 illustrates an embodiment of a centralized system for the system of FIG. 1.

FIG. 14 illustrates a centralized system 1400. The centralized system 1400 may implement some or all of the structure and/or operations for the system 100 for securing delivery of an animated message in a single computing entity, such as entirely within a single device 1420.

The device 1420 may comprise any electronic device capable of receiving, processing, and sending information, and may be an embodiment of a mobile device, e.g. mobile device 110 or 200. Examples of an electronic device may include without limitation an ultra-mobile device, a mobile device, a personal digital assistant (PDA), a mobile computing device, a smart phone, a telephone, a digital telephone, a cellular telephone, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 1420 may execute processing operations or logic for the system 100 using a processing component 1430. The processing component 1430 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 1420 may execute communications operations or logic for the system 100 using communications component 1440. The communications component 1440 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 1440 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 1412 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 1420 may communicate with other devices 1450 over a communications media 1442 using communications signals 1444 via the communications component 1440. The devices 1450 may be internal or external to the device 1420 as desired for a given implementation.

The device 1420 may include within it the animation application component 250. The device 1420 may include within it various input components 1412, which may include keyboards, touch-sensitive interfaces, microphones, cameras, and the like, for example, as shown in FIG. 2. The device 1420 may include within it various output components 1414, which may include speakers, displays, and the like, for example as shown in FIG. 2. Device 1420 may be operative to carry out the tasks of these elements using processing component 1430 and communications component 1440. Devices 1450 may comprise any of devices 110 or 150, the signals 1414 over media 1412 comprising the interactions between the device 1420 and its elements and these respective devices.

Figure 15:
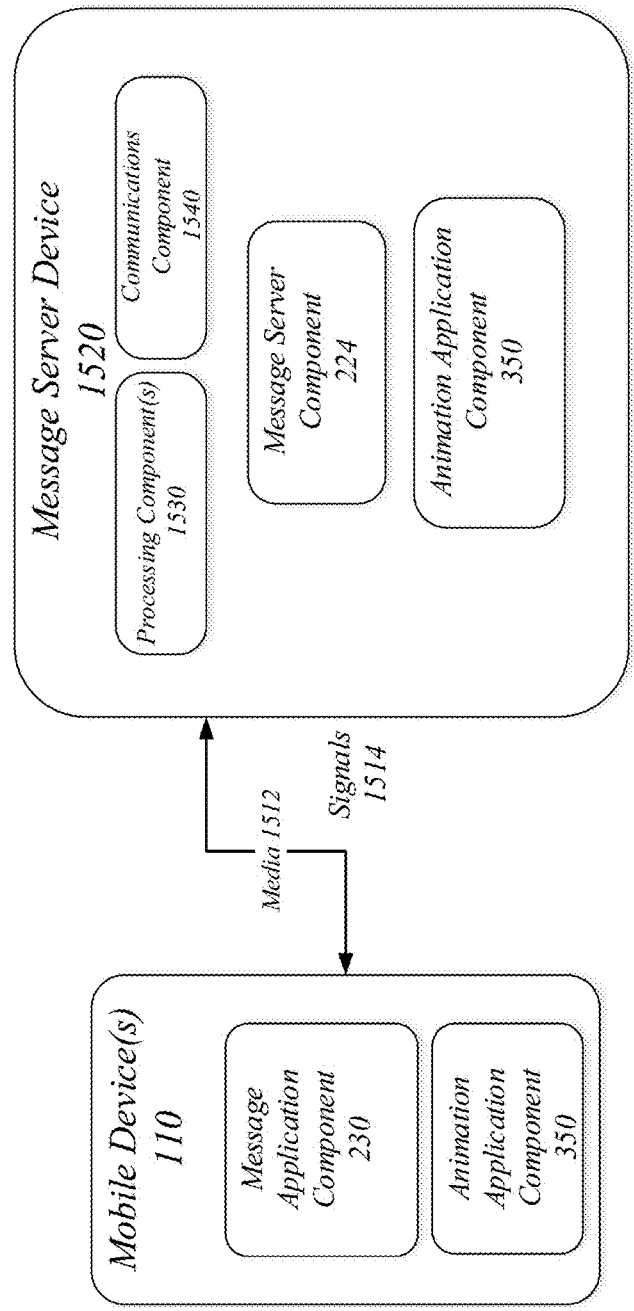
FIG. 15 illustrates an embodiment of a distributed system for the system of FIG. 1.

FIG. 15 illustrates an embodiment of a distributed system 1500. The distributed system 1500 may distribute portions of the structure and/or operations for the system 100 across multiple computing entities. Examples of distributed system 1500 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 1500 may comprise a message server device 1520. In general, the message server device 1520 may be similar to the device 1420 as described with reference to FIG. 14. For instance, the message server device 1520 may comprise, a processing component 1530 and a communications component 1540, which are the same or similar to the processing component 1430 and the communications component 1440, respectively, as described with reference to FIG. 14. In another example, the message server device 1520 may communicate over a communications media 1512 using communications signals 1514 via the communications components 1540.

The message server device 1520 may comprise or employ one or more server programs that operate to perform various methodologies in accordance with the described embodiments. For example, message server device 1520 may implement the message server component 224, as well as some or all of the components of the animation application component 350. It will be appreciated the server device 1520—or any of the server devices discussed herein—may itself comprise multiple servers.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 16:
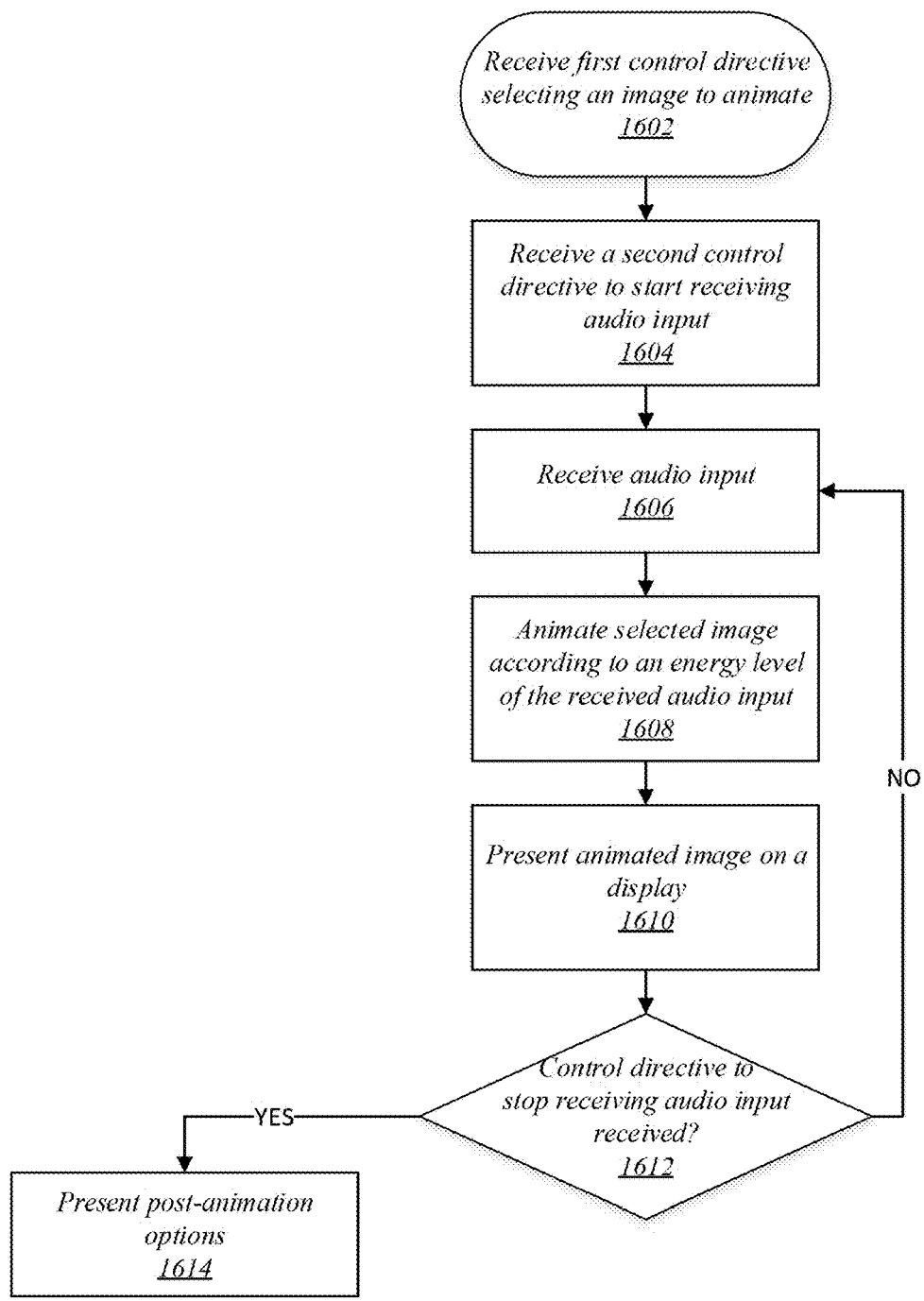
FIG. 16 illustrates an embodiment of a logic flow for the system of FIG. 1.

FIG. 16 illustrates an embodiment of a logic flow 1600 for the system 100. The logic flow 1600 may be representative of some or all of the operations executed by one or more embodiments described herein. The operations of the logic flow 1600 may be performed by an animation application component 250 on a mobile device 110.

In the illustrated embodiment shown in FIG. 16, the logic flow 1600 may be operative at block 1602 to receive a first control directive selecting an image to animate. For example, the GUI generator 332 may present one or more images that represent sticker sets on a display component, and may receive a selection by the operator via a control directive. When the animation frames of the selected image are not in the local storage, the animation application component may retrieve the set of animation frames from a remote storage, e.g. from the server 220.

The logic flow 1600 may be operative at block 1604 to receive a second control directive to start recording audio input. For example, the GUI generator 332 may present a UI element that, when operated on with a control directive, directs the microphone to receive audio input, and the sticker recorder 334 to record the audio input. In some embodiments, the first and second control directives may be combined into a single control directive that both selects an image and starts receiving and recording audio input.

The logic flow 1600 may be operative at block 1606 to receive audio input, responsive to the second control directive. For example, the sticker recorder 334 may receive audio input from the microphone. The energy analyzer 336 may also receive the audio input, either directly from the microphone or from the sticker recorder 334. In some embodiments, the audio input may be received from an audio data file, e.g. from previously recorded audio input.

The logic flow 1600 may be operative at block 1608 to animate the selected image according to an energy level of the received audio input. For example, the sticker animator 338 selects animation frames in the selected sticker set to output based on the energy level of the received audio input. The animation frames in the sticker set may be mapped to sub-ranges of a range of measured energy levels, such that an measured energy level in one sub-range will cause the animation frame mapped to that sub-range to be output. The sequence of animation frames may be stored, along with the received audio input, as an animated sticker, which may be played on demand at later times. An embodiment of the block 1608 is described with respect to FIG. 17.

The logic flow 1600 may be operative at block 1610 to present the animated image on a display. The block 1610 may occur simultaneously with the block 1608 by presenting the selected animation frames in the sequence. The animated image may appear, to the human observer, to be animated according to the audio input as the audio input is received. For example, if the selected sticker set includes a representation of a face, with animation frames showing different sized mouth openings, the animated image may appear to open the mouth to different sizes according to how loudly the speaker or source of audio input is currently speaking.

The logic flow 1600 may be operative at block 1612 to determine whether a control directive has been received to stop receiving audio input. When no such control directive has been received, the logic flow 1600 may return to the block 1606.

The logic flow 1600 may be operative at block 1614 to present post-animation options, when the control directive to stop receiving audio input is received. For example, the options may include saving the animated sticker, deleting the animated sticker, sending the animated sticker as a message, and/or applying after-effects to the animated sticker.

Figure 17:
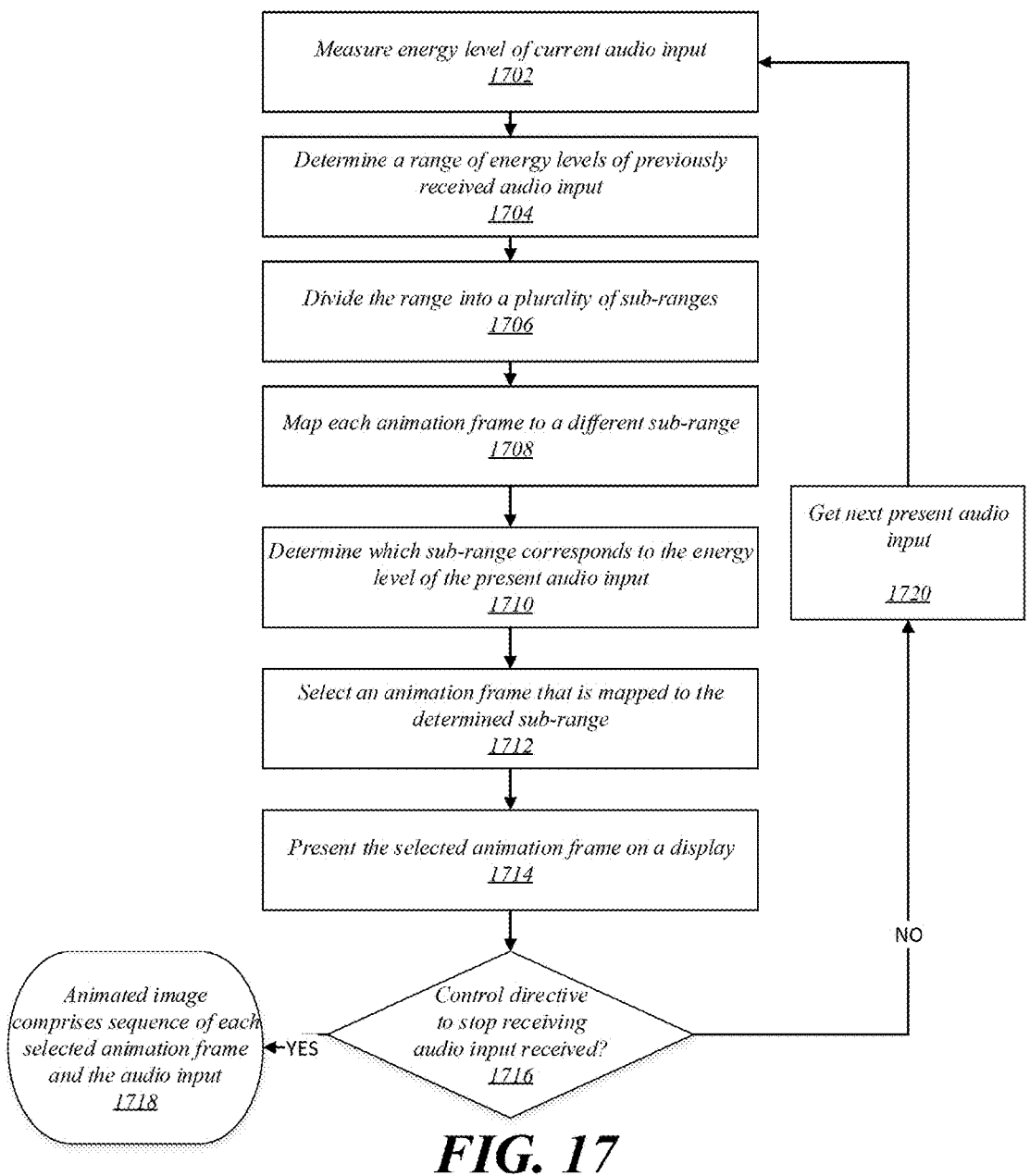
FIG. 17 illustrates an embodiment of a second logic flow for the system of FIG. 1.

FIG. 17 illustrates an embodiment of a logic flow 1700 for the system 100. The logic flow 1700 may be representative of some or all of the operations executed by one or more embodiments described herein. The operations of the logic flow 1700 may be performed by the mobile device 110 when an audio message is received by the mobile device. In particular, the logic flow 1700 may represent an embodiment of the block 1608 from the logic flow 1600.

In the illustrated embodiment shown in FIG. 17, the logic flow 1700 may begin at block 1702. In block 1702, the energy level of the current audio input may be measured. For example, the energy analyzer 336 may measure the energy level of audio input at a current time, and may store past measurements. The energy level of the audio input may be measured at periodic intervals, or continuously.

The logic flow 1700 may be operative at block 1704 to determine a range of energy levels of previously received audio input. The range may be determined as the range of energy values between a highest energy level and a lowest energy level in the selected previously received audio input. The energy analyzer 336 may, for example, determine the range from the previous one second's worth of energy level measurements, or from the last quarter of a second. The energy analyzer 336 may normalize the determined range, in order to make the high and low values consistent over the time of the animation.

The logic flow 1700 may be operative at block 1706 to divide the range into a plurality of sub-ranges. Determining the range of energy levels may also include dividing the range into two or more sub-ranges. The number of sub-ranges may match the number of animation frames in the selected sticker set. When the determined range is normalized, the sub-ranges may be created once for the animation. When the determined range is not normalized, the range may need to be re-determined at periodic intervals, and the sub-ranges may need to be re-determined as well.

The logic flow 1700 may be operative at block 1708 to map each animation frame to a different sub-range. For example, a sticker set comprising a plurality of animation frames may arrange the animation frame in an ordering that reflects a range of possible energy levels. For example, the lowest energy animation frame may be first in the ordering, followed by the animation frames for successively higher energy levels. The sticker animator 338 may map each animation frame in the ordering to the sub-ranges in the same ordering of lowest to highest energy levels.

The logic flow 1700 may be operative at block 1710 to determine which sub-range corresponds to the energy level of the present audio input. For example, the energy analyzer 336 or the sticker animator 338 may select the sub-range having high and low energy levels values that include the energy level of the present audio input.

The logic flow 1700 may be operative at block 1712 to select an animation frame that is mapped to the determined sub-range.

The logic flow 1700 may be operative at block 1714 to present the selected animation frame on a display. For example, the sticker animator 338 may provide the selected animation frame, or an identifier of the selected animation frame to the GUI generator 332 to present on the display component. On successive iterations of the logic flow 1700, the presentation of the selected animation frame replaces a previously presented animation frame at a frame rate that creates the effect of a moving picture.

The logic flow 1700 may be operative at block 1716 to determine whether the control directive to stop receiving audio input has been received. When no such control directive has been received, the logic flow 1700 may continue to the block 1720.

When the control directive to stop receiving audio input is received, the logic flow 1700 ends at block 1718. The result of the operations of the logic flow 1700 is an animated image, also referred to as an animated sticker, that comprises a sequence of animation frames and the audio input. When presented at a particular frame rate, the sequence of animation frames appears to be animated according to the audio input. The animated image may be stored as a single data file, or may be stored in separate files that can be used to generate the animation.

The logic flow 1700 may be operative at block 1720 to get the next present audio input, when the control directive to stop receiving audio input has not been received. The logic flow 1700 then repeats starting at block 1702. In embodiments where the range of energy levels is normalized, blocks 1704, 1706, and 1708 may be skipped on subsequent iterations. In such an embodiment, the block 1702 may further include normalizing the measured energy level of the present audio input according to the same normalization used to determine the range.

Figure 18:
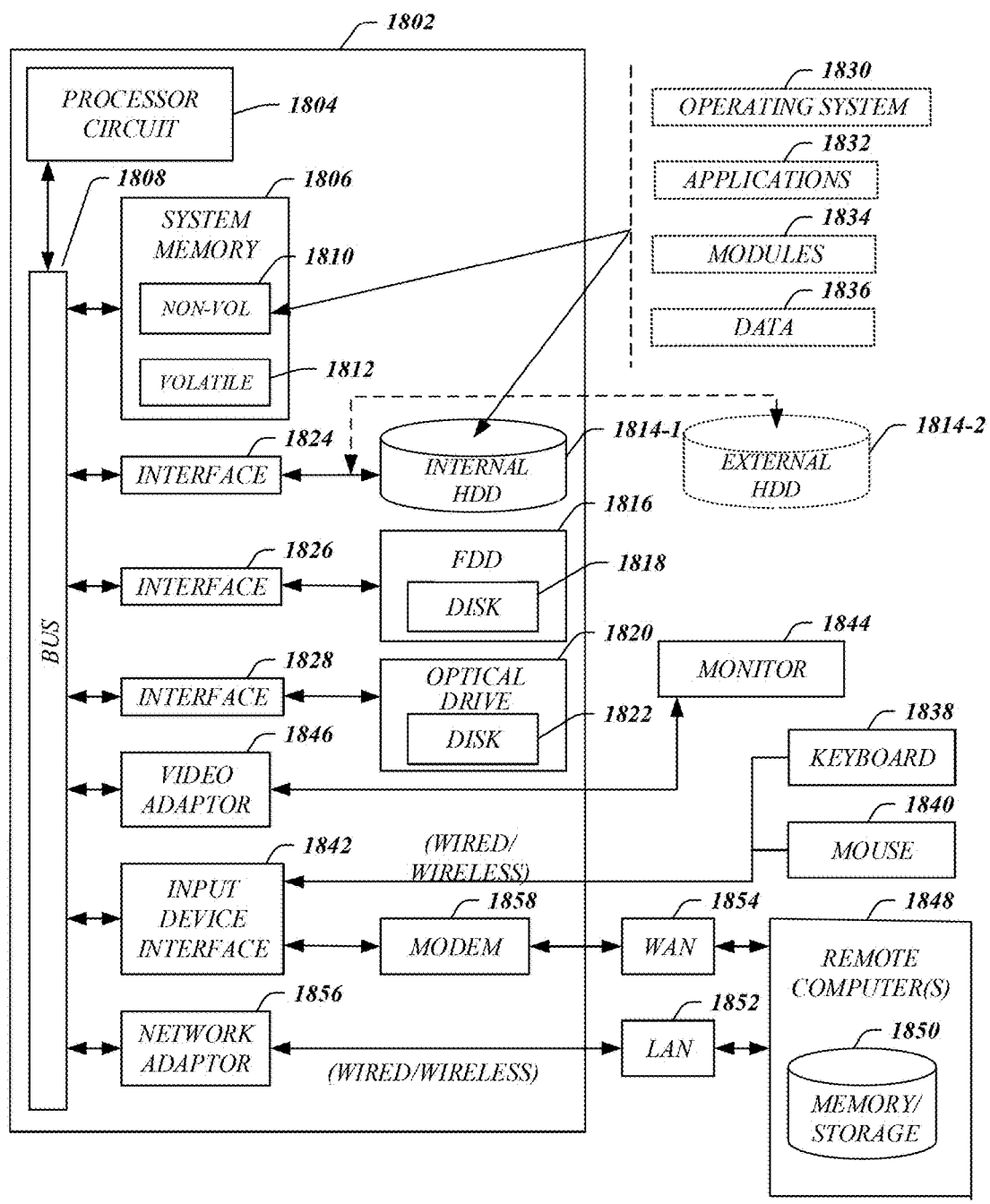
FIG. 18 illustrates an embodiment of a computing architecture.

FIG. 18 illustrates an embodiment of an exemplary computing architecture 1800 suitable for implementing various embodiments as previously described. In one embodiment, the computing architecture 1800 may comprise or be implemented as part of an electronic device. Examples of an electronic device may include those described with reference to FIGS. 14-15, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1800.

As shown in FIG. 18, the computing architecture 1800 comprises a processing circuit 1804, a system memory 1806 and a system bus 1808. The processing circuit 1804 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing circuit 1804.

The system bus 1808 provides an interface for system components including, but not limited to, the system memory 1806 to the processing circuit 1804. The system bus 1808 can be any of several types of bus structure that may further interconnect to a memory bus (with or without a memory controller), a peripheral bus, and a local bus using any of a variety of commercially available bus architectures. Interface adapters may connect to the system bus 1808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1800 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 18, the system memory 1806 can include non-volatile memory 1810 and/or volatile memory 1812. A basic input/output system (BIOS) can be stored in the non-volatile memory 1810.

The computer 1802 may include various types of computer-readable storage media in the form of one or more lower speed memory units, including an internal (or external) hard disk drive (HDD) 1814-1 and 1814-2, respectively, a magnetic floppy disk drive (FDD) 1816 to read from or write to a removable magnetic disk 1818, and an optical disk drive 1820 to read from or write to a removable optical disk 1822 (e.g., a CD-ROM or DVD). The HDD 1814, FDD 1816 and optical disk drive 1820 can be connected to the system bus 1808 by a HDD interface 1824, an FDD interface 1826 and an optical drive interface 1828, respectively. The HDD interface 1824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1810, 1812, including an operating system 1830, one or more application programs 1832, other program modules 1834, and program data 1836. In one embodiment, the one or more application programs 1832, other program modules 1834, and program data 1836 can include, for example, the various applications and/or components of the message application component 230, the animation application component 250, 350; and the message server component 224.

An operator can enter commands and information into the computer 1802 through one or more wire/wireless input devices, for example, a keyboard 1838 and a pointing device, such as a mouse 1840. Other input devices may include microphones, infra-red (IR) remote controls, radio-frequency (RF) remote controls, game pads, stylus pens, card readers, dongles, fingerprint readers, gloves, graphics tablets, joysticks, keyboards, retina readers, touch screens (e.g., capacitive, resistive, etc.), trackballs, trackpads, sensors, styluses, and the like. These and other input devices are often connected to the processing circuit 1804 through an input device interface 1842 that is coupled to the system bus 1808, but can be connected by other interfaces such as a parallel port, IEEE 1394 serial port, a game port, a USB port, an IR interface, and so forth.

A monitor 1844 or other type of display device is also connected to the system bus 1808 via an interface, such as a video adaptor 1846. The monitor 1844 may be internal or external to the computer 1802. In addition to the monitor 1844, a computer typically includes other peripheral output devices, such as speakers, printers, and so forth.

The computer 1802 may operate in a networked environment using logical connections via wired and/or wireless communications to one or more remote computers, such as a remote computer 1848. The remote computer 1848 can be a workstation, a server computer, a router, a personal computer, a portable computer, a microprocessor-based entertainment appliance, a peer device or other common network node, and typically includes many or all of the elements described relative to the computer 1802, although, for purposes of brevity, only a memory/storage device 1850 is illustrated. The logical connections depicted include wired/wireless connectivity to a local area network (LAN) 1852 and/or larger networks, for example, a wide area network (WAN) 1854. Such LAN and WAN networking environments are commonplace in offices and companies, and facilitate enterprise-wide computer networks, such as intranets, all of which may connect to a global communications network, for example, the Internet.

When used in a LAN networking environment, the computer 1802 is connected to the LAN 1852 through a wired and/or wireless communication network interface or adaptor 1856. The adaptor 1856 can facilitate wired and/or wireless communications to the LAN 1852, which may also include a wireless access point disposed thereon for communicating with the wireless functionality of the adaptor 1856.

When used in a WAN networking environment, the computer 1802 can include a modem 1858, or is connected to a communications server on the WAN 1854, or has other means for establishing communications over the WAN 1854, such as by way of the Internet. The modem 1858, which can be internal or external and a wired and/or wireless device, connects to the system bus 1808 via the input device interface 1842. In a networked environment, program modules depicted relative to the computer 1802, or portions thereof, can be stored in the remote memory/storage device 1850. It will be appreciated that the network connections shown are exemplary and other means of establishing a communications link between the computers can be used.

The computer 1802 is operable to communicate with wire and wireless devices or entities using the IEEE 802 family of standards, such as wireless devices operatively disposed in wireless communication (e.g., IEEE 802.21 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.21x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 19:
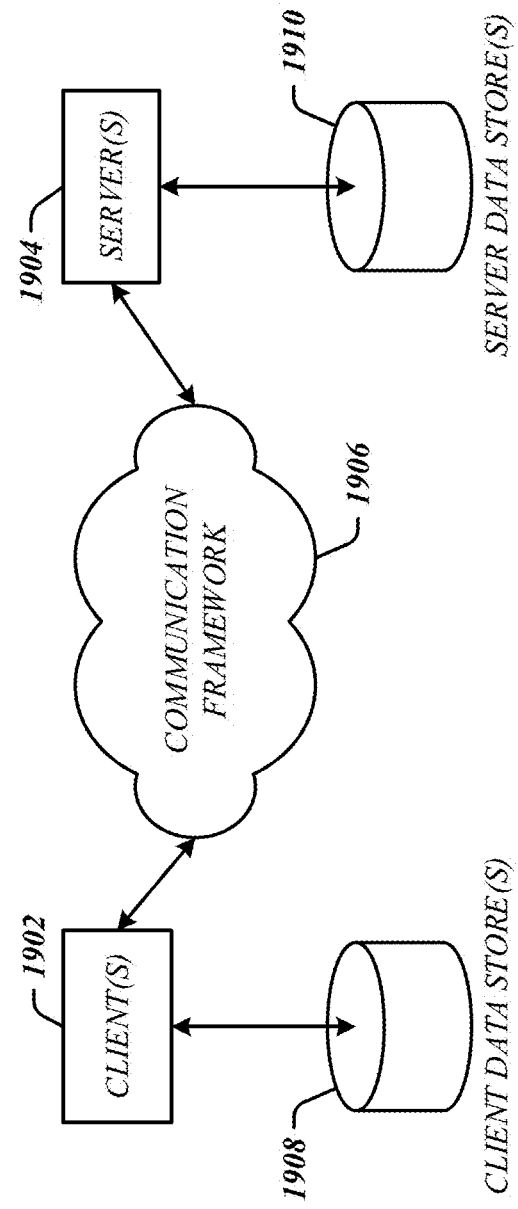
FIG. 19 illustrates an embodiment of a communications architecture.

FIG. 19 illustrates a block diagram of an exemplary architecture 1900 suitable for implementing various embodiments as previously described. The communications architecture 1900 includes various common communications elements, such as a transmitter, receiver, transceiver, radio, network interface, baseband processor, antenna, amplifiers, filters, power supplies, and so forth. The embodiments, however, are not limited to this implementation by the communications architecture 1900.

As shown in FIG. 19, the communications architecture 1900 comprises one or more clients 1902 and servers 1904. The clients 1902 may implement the devices 1420. The servers 1904 may implement the server devices 1520. The clients 1902 and the servers 1904 are operatively connected to one or more respective client data stores 1908 and server data stores 1910 that can be employed to store information local to the respective clients 1902 and servers 1904, such as cookies and/or associated contextual information.

The clients 1902 and the servers 1904 may communicate information among each other using a communication framework 1906. The communications framework 1906 may implement any well-known communications techniques and protocols. The communications framework 1906 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1906 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1902 and the servers 1904. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 20:
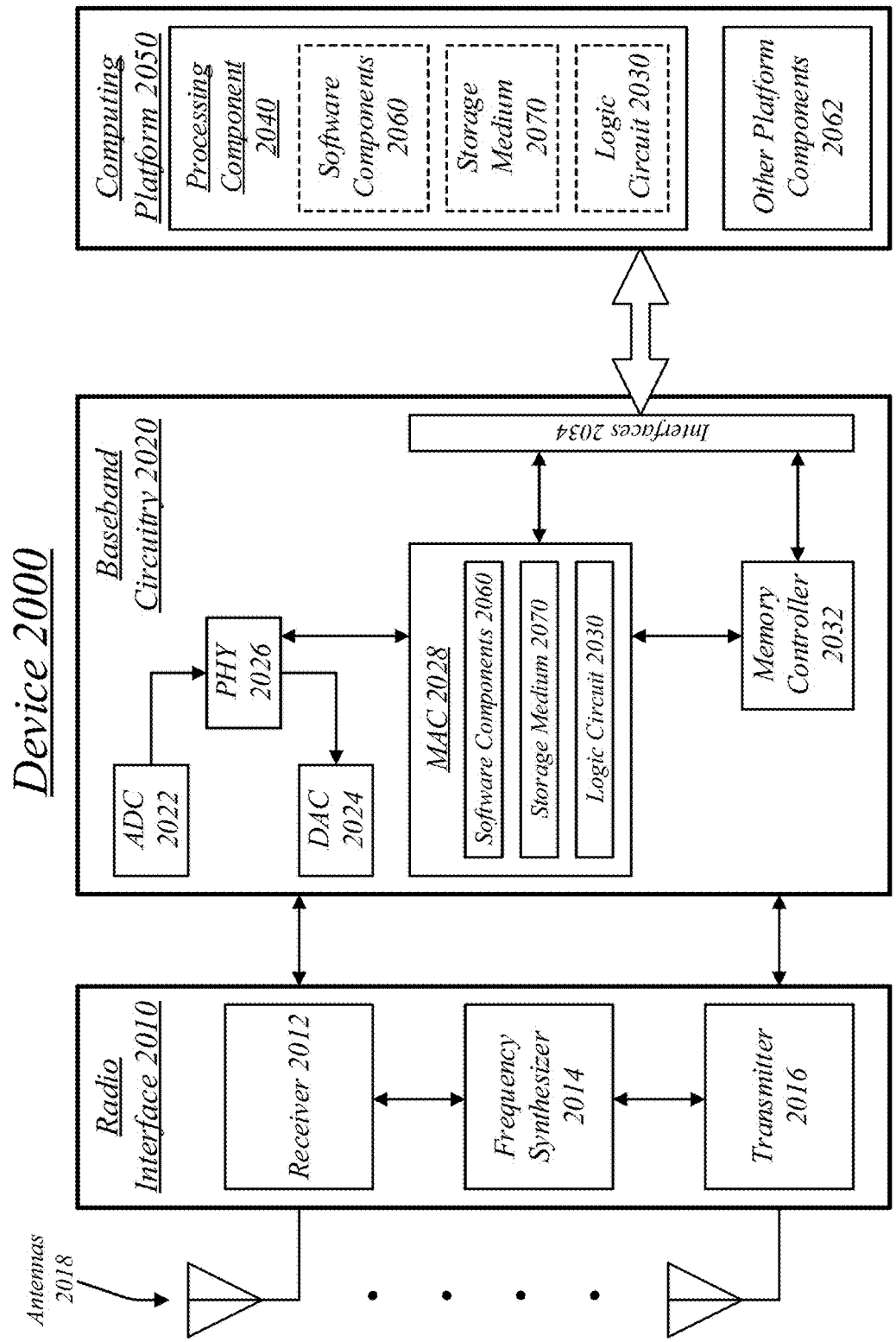
FIG. 20 illustrates an embodiment of a device for use in a multicarrier OFDM system.

FIG. 20 illustrates an embodiment of a device 2000 for use in a multicarrier OFDM system, such as the animated messaging system 100. Device 2000 may implement, for example, software components 2060 as described with reference to mobile device 200 and/or a logic circuit 2030. The logic circuit 2030 may include physical circuits to perform operations described for the mobile device 200. As shown in FIG. 20, device 2000 may include a radio interface 2010, baseband circuitry 2020, and computing platform 2050, although embodiments are not limited to this configuration.

The device 2000 may implement some or all of the structure and/or operations for the mobile device 200 and/or logic circuit 2030 in a single computing entity, such as entirely within a single device. Alternatively, the device 2000 may distribute portions of the structure and/or operations for the mobile device 200 and/or logic circuit 2030 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 2010 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 2010 may include, for example, a receiver 2012, a transmitter 2016 and/or a frequency synthesizer 2014. Radio interface 2010 may include bias controls, a crystal oscillator and/or one or more antennas 2018. In another embodiment, radio interface 2010 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 2020 may communicate with radio interface 2010 to process, receive and/or transmit signals and may include, for example, an analog-to-digital converter 2022 for down converting received signals, a digital-to-analog converter 2024 for up converting signals for transmission. Further, baseband circuitry 2020 may include a baseband or physical layer (PHY) processing circuit 2026 for PHY link layer processing of respective receive/transmit signals. Baseband circuitry 2020 may include, for example, a processing circuit 2028 for medium access control (MAC)/data link layer processing. Baseband circuitry 2020 may include a memory controller 2032 for communicating with processing circuit 2028 and/or a computing platform 2050, for example, via one or more interfaces 2034.

In some embodiments, PHY processing circuit 2026 may include a frame construction and/or detection module, in combination with additional circuitry such as a buffer memory, to construct and/or deconstruct communication frames, such as radio frames. Alternatively or in addition, MAC processing circuit 2028 may share processing for certain of these functions or perform these processes independent of PHY processing circuit 2026. In some embodiments, MAC and PHY processing may be integrated into a single circuit.

The computing platform 2050 may provide computing functionality for the device 2000. As shown, the computing platform 2050 may include a processing component 2040. In addition to, or alternatively, the baseband circuitry 2020, the device 2000 may execute processing operations or logic for the mobile device 200 and logic circuit 2030 using the processing component 2040. The processing component 2040 (and/or PHY 2026 and/or MAC 2028) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 2050 may further include other platform components 2062. Other platform components 2062 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth.

The computing platform 2050 and the baseband circuitry 2020 may further include one or memory units in the form of storage medium 2070. Examples of memory units may include, without limitation. various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 2000 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 2000 described herein, may be included or omitted in various embodiments of device 2000, as suitably desired. In some embodiments, device 2000 may be configured to be compatible with protocols and frequencies associated one or more of the 3GPP LTE Specifications and/or IEEE 802.16 standards for WMANs, and/or other broadband wireless networks, cited herein, although the embodiments are not limited in this respect.

Embodiments of device 2000 may be implemented using single input single output (SISO) architectures. However, certain implementations may include multiple antennas (e.g., antennas 2018) for transmission and/or reception using adaptive antenna techniques for beamforming or spatial division multiple access (SDMA) and/or using MIMO communication techniques.

The components and features of device 2000 may be implemented using any combination of discrete circuitry, application specific integrated circuits (ASICs), logic gates and/or single chip architectures. Further, the features of device 2000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 2000 shown in the block diagram of FIG. 20 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Accordingly, embodiments include methods, apparatuses, and computer-readable storage media for communicating using audio messages. For example, a method may include receiving a first control directive to select an image representing a set of animation frames in a user interface view of an application executing on a first mobile device; receiving a second control directive to begin receiving audio input in the user interface view; receiving audio input by the first mobile device; animating the image according to an energy level of the audio input using the animation frames; and presenting the animated image concurrently with receiving the audio input.

A computer-implemented method may further comprise animating the image by: measuring an energy level of the audio input, and at periodic intervals: determining a range of energy levels of previously received audio input over a period from a first past time to a present time; dividing the range of energy levels into a plurality of sub-ranges; mapping each animation frame in the set of animation frames to a different one of the sub-ranges; determining which sub-range corresponds to the measured energy level of a present audio input; selecting an animation frame in the set of animation frames that is mapped to the determined sub-range; and presenting the selected animation frame on a display of the first computing device and outputting the present audio input.

A computer-implemented method may further comprise normalizing the measurements of energy levels to a range comprising a first value and a second value. The number of sub-ranges matches a number of animation frames in the set of animation frames. The animated image comprises a sequence of each animation frame selected, in the order of the selection, and the received audio input.

The application may be a messaging application or a social networking application.

A computer-implemented method may further comprise retrieving the set of animation frames from a remote storage in response to the first control directive.

A computer-implemented method may further comprise receiving a third control directive to stop receiving the audio input; and storing the animated image on a local storage device.

A computer-implemented method may further comprise presenting the selected image in the user interface view with: a first selectable user interface element to play the animated image on the display; a second selectable user interface element to send the animated image as a message; a third selectable user interface element to delete the animated image; or a fourth selectable user interface element to store the animated image on a local storage device.

A computer-implemented method may further comprise sending the animated image as a message to a remote computing device.

A computer-implemented method may further comprise applying an audio effect to the animated image.

A computer-implemented method may further comprise receiving the audio input from a microphone on the first mobile device.

An apparatus may include a processor circuit; an animation application component for execution on the processor circuit, the animation application component comprising: a graphical user interface (GUI) generator to generate user interface views on the display having images representing a set of animation frames, to receive a first control directive to select an image, to receive a second control directive to begin recording audio input, and to present an animated image; a sticker recorder to receive audio input in response to the second control directive; and a sticker animator to animate the selected image according to an energy level of the audio input using the animation frames concurrently with the receiving of the audio input. The apparatus may be operative to implement any of the computer-implemented methods described herein.

The animation application component may comprise: an energy analyzer to measure an energy level of the audio input, and at periodic intervals, to: determine a range of energy levels of previously received audio input over a period from a first past time to a present time, divide the range of energy levels into a plurality of sub-ranges, and determine which sub-range corresponds to the measured energy level of a present audio input; the sticker animator, at each interval, to map each animation frame in the set of animation frames to a different one of the sub-ranges, to select an animation frame in the set of animation frames that is mapped to the determined sub-range, and the GUI generator to present, at each interval, the animated image as a sequence of selected animation frames concurrently with output of the present audio input.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implemented method, comprising:
receiving a selection of an animated image at a first device, the animated image comprising a number of animation frames;
receiving audio input by a first device;
at periodical intervals during receipt of the audio input:
determining a volume range exhibited in received portions of the audio input;
determining a number of loudness tiers in the audio input by dividing the determined volume range by the number of animation frames in the animated image;
mapping each animation frame in the animated image to a different one of the loudness tiers;
assigning a selected animation frame from animated image to a most recently received portion of the audio input based on the loudness tier corresponding to the most recently received portion; and
presenting the selected animation frame as part of a real-time animation on a user interface view of an application executing on the first device.

2. The method of claim 1, wherein determining the volume range comprises:
measuring an energy level of the most recently received portion of the audio input; and
determining a range of energy levels of previously received portions of the audio input over a period from a first past time to a present time.

3. The method of claim 2, comprising:
normalizing the measurements of energy levels to a range comprising a first value and a second value.

4. The method of claim 1, comprising:
retrieving the set of animation frames from a remote storage in response to a first control directive selecting the image.

5. The method of claim 1, comprising:
presenting the selected image in the user interface view with: a first selectable user interface element to play the animated image on the display; a second selectable user interface element to send the animated image as a message; a third selectable user interface element to delete the animated image; or a fourth selectable user interface element to store the animated image on a local storage device.

6. The method of claim 1, comprising:
sending the animated image as a message to a remote computing device.

7. The method of claim 1, comprising:
applying an audio effect to the animated image.

8. The method of claim 1 wherein the periodic interval corresponds to a frame rate of the animated image.

9. An apparatus, comprising:
a display;
a processor circuit; and
a non-transitory computer-readable medium storing animation application logic, the processor circuit configured to execute the animation application logic to:
generate user interface views on the display having animated images comprising a number of animation frames;
receive a first control directive to select an animated image;
receive a second control directive to begin recording audio input;
receive audio input in response to the second control directive,
at periodical intervals during receipt of the audio input:
determine a volume range exhibited in received portions of the audio input,
determine a number of loudness tiers in the audio input by dividing the determined volume range by the number of the animation frames in the selected animated image,
map each animation frame in the selected animated image to a different one of the loudness tiers;
assign a selected animation frame from the selected animated image to a most recently received portion of the subsequent audio input based on the loudness tier corresponding to the most recently received portion, and
present the selected animation frame as part of a real-time animation on the display.

10. The apparatus of claim 9, the animation application logic further configured to cause the processor circuit to:
measure an energy level of the most recently received portion of the audio input; and
determine a range of energy levels of previously received portions of the audio input over a period from a first past time to a present time.

11. The apparatus of claim 10, the processor circuit further configured to normalize the measurements of energy levels between a first value and a second value.

12. The apparatus of claim 9, the processor circuit further configured to:
present the selected image in the user interface view with: a first selectable user interface element to play the animated image on the display; a second selectable user interface element to send the animated image as a message; a third selectable user interface element to delete the animated image; or a fourth selectable user interface element to store the animated image on a local storage device.

13. The apparatus of claim 9 were in the periodic interval corresponds to a frame rate of the animated image.

14. At least one computer-readable storage medium comprising instructions for a message application component that, when executed, cause a device to:
receive a selection of an animated image at a first device, the animated image comprising a set of animation frames;
receive audio input;
determine a volume range exhibited in the audio input;
divide the audio input into a number of loudness tiers based on the determined volume range, the number of loudness tiers corresponding to a number of the animation frames in the animated image;
receiving subsequent audio input;
measure an overall volume corresponding to a loudness of the subsequent audio input;
at periodic intervals while the audio input is received:
determine a range of loudnesses of previously received audio input over a period from a first past time to a present time;
divide the range of loudnesses into a plurality of sub-ranges;
determine which sub-range corresponds to the measured overall volume of a present audio input;
determine an animation frame mapped to the determined sub-range; and
present the determined animation frame on a display of the device in real-time as the present audio input is received.

15. The computer-readable storage medium of claim 14, the animation frame determined from a set of animation frames corresponding to a selected image.

16. The computer-readable storage medium of claim 14, comprising instructions that when executed, cause the device to:
normalize the measured energy levels to a range comprising a first value and a second value.

17. The computer-readable storage medium of claim 14, comprising instructions that when executed, cause the device to:
store each determined animation frame in an order of the determination and the received audio input as an animated image in a local storage on the device.

18. The computer-readable storage medium of claim 17, comprising instructions that when executed, cause the device to:
send the animated image as a message to a remote computing device.

19. The computer-readable storage medium of claim 14, wherein the periodic interval is a fraction of one second.

20. The computer-readable storage medium of claim 14, wherein a duration between the first past time to the present time is different from the periodic interval.

* * * * *